US010960910B1

(12) United States Patent
Garcia

(10) Patent No.: US 10,960,910 B1
(45) Date of Patent: Mar. 30, 2021

(54) TRAY STORAGE SYSTEM

(71) Applicant: Cambro Manufacturing Company, Huntington Beach, CA (US)

(72) Inventor: Jorge Baez Garcia, Lake Forest, CA (US)

(73) Assignee: Cambro Manufacturing Company, Huntington Beach, CA (US)

( * ) Notice: Subject to any disclaimer, the term of this patent is extended or adjusted under 35 U.S.C. 154(b) by 96 days.

(21) Appl. No.: 15/799,875

(22) Filed: Oct. 31, 2017

(51) Int. Cl.
*A47B 31/00* (2006.01)
*B62B 3/00* (2006.01)
*B62B 3/02* (2006.01)
*A47B 57/34* (2006.01)
*B62B 3/10* (2006.01)

(52) U.S. Cl.
CPC ............ *B62B 3/005* (2013.01); *A47B 57/34* (2013.01); *B62B 3/006* (2013.01); *B62B 3/02* (2013.01); *A47B 2031/003* (2013.01); *B62B 3/108* (2013.01)

(58) Field of Classification Search
CPC .......... B62B 3/005; B62B 3/108; B62B 3/02; B62B 3/006; B62B 2205/006; B62B 2205/32; A47B 57/34; A47B 31/00; A47B 2031/003; A47B 2031/005; A47B 47/0083; A47B 47/045; A47B 57/545; A47B 88/417; A47B 2210/0024; A47B 88/40; A47B 31/02; A47B 57/10; A47B 67/00; A47B 2031/004; A47B 67/04; A61G 12/001; A47F 5/137; A47J 39/006

USPC ..... 312/265.5, 350, 249.11, 263, 351, 249.8, 312/334.4; 211/126.15, 126.1; 280/47.35, 47.19, 79.2, 79.3
See application file for complete search history.

(56) References Cited

U.S. PATENT DOCUMENTS

| | | | | | |
|---|---|---|---|---|---|
| 2,566,622 | A | * | 9/1951 | Millier | E04B 2/62 52/690 |
| 2,907,471 | A | * | 10/1959 | Henry | A47B 57/404 108/109 |
| 2,936,899 | A | * | 5/1960 | Tashman | A47B 57/12 211/85.4 |
| 2,995,257 | A | * | 8/1961 | D'Anka | A47B 31/00 211/208 |
| 3,127,995 | A | * | 4/1964 | Mosinski | A47B 57/402 211/191 |
| 3,199,683 | A | * | 8/1965 | Graswich | A47B 57/425 108/109 |
| 3,358,848 | A | * | 12/1967 | Johnsson | A47B 57/40 211/190 |
| 3,610,429 | A | * | 10/1971 | MacKay | A47B 13/14 108/109 |

(Continued)

*Primary Examiner* — Hiwot E Tefera
(74) *Attorney, Agent, or Firm* — Rutan & Tucker, LLP

(57) ABSTRACT

A rail assembly for maintaining trays for temporary storage. The rail assembly features a plurality of support members and a plurality of post attachment members. The plurality of support members include a plurality of raised edges and a plurality of shelf members, each of the plurality of shelf members extend from a corresponding raised edge of the plurality of raised edges. The plurality of post attachment members extend outwardly from the plurality of support members. Each of the plurality of post attachment members includes a first connection arm configured for attachment to a first side of a vertical post and a second connection arm configured for attachment to a second side of the vertical post.

14 Claims, 13 Drawing Sheets

(56) References Cited

U.S. PATENT DOCUMENTS

| | | | | |
|---|---|---|---|---|
| 3,698,782 | A * | 10/1972 | Onori | A47B 31/00 312/350 |
| 3,740,109 | A * | 6/1973 | Pfaffendorf | A47B 43/02 312/261 |
| 3,963,125 | A * | 6/1976 | Baggott | A47B 31/00 211/126.15 |
| 4,097,100 | A * | 6/1978 | Sauder | A47B 96/201 312/204 |
| 4,113,329 | A * | 9/1978 | Thurman | B65D 11/14 206/509 |
| 4,285,436 | A * | 8/1981 | Konstant | A47B 57/482 211/192 |
| 4,616,890 | A * | 10/1986 | Romick | E05B 65/462 312/216 |
| 4,693,383 | A * | 9/1987 | Fenwick | A47B 47/03 211/192 |
| RE34,171 | E * | 2/1993 | Romick | A47B 47/00 312/216 |
| 5,673,983 | A * | 10/1997 | Carlson | A47B 67/04 312/218 |
| 5,685,442 | A * | 11/1997 | Yoshino | A47B 43/00 211/126.1 |
| 5,934,486 | A | 8/1999 | Jarvis et al. | |
| 5,975,660 | A * | 11/1999 | Tisbo | A47B 47/045 312/108 |
| 6,079,719 | A * | 6/2000 | Tisbo | B62B 3/006 280/47.19 |
| D498,664 | S | 11/2004 | Gates | |
| 6,981,454 | B2 | 1/2006 | Burdick | |
| D630,935 | S | 1/2011 | Jarvis | |
| 7,963,408 | B2 * | 6/2011 | Glover | A47B 88/57 211/126.15 |
| D648,159 | S | 11/2011 | Hense et al. | |
| D648,160 | S | 11/2011 | Le | |
| D648,582 | S | 11/2011 | Le | |
| D651,433 | S | 1/2012 | Le et al. | |
| 8,376,156 | B2 | 2/2013 | Jarvis et al. | |
| 8,376,157 | B2 | 2/2013 | Jarvis et al. | |
| 8,627,966 | B2 | 1/2014 | Jarvis et al. | |
| 8,960,822 | B1 * | 2/2015 | Hsu | A47B 96/00 312/334.4 |
| D727,715 | S | 4/2015 | Munson | |
| D728,347 | S | 5/2015 | Munson | |
| D728,348 | S | 5/2015 | Munson | |
| 9,084,498 | B2 | 7/2015 | Maddux | |
| 9,161,620 | B2 | 10/2015 | Nicholson | |
| 9,375,102 | B2 * | 6/2016 | Troyner | A47B 57/402 |
| 9,493,177 | B1 * | 11/2016 | Chen | B62B 3/005 |
| 9,801,476 | B2 | 10/2017 | Maddux et al. | |
| 9,986,825 | B1 * | 6/2018 | Lin | A47B 47/0083 |
| 2005/0077805 | A1 * | 4/2005 | Dalebout | A47B 31/00 312/249.11 |
| 2011/0233882 | A1 * | 9/2011 | Belanger | B62B 3/003 280/47.35 |
| 2013/0221820 | A1 * | 8/2013 | Chang | B25H 3/02 312/330.1 |

\* cited by examiner

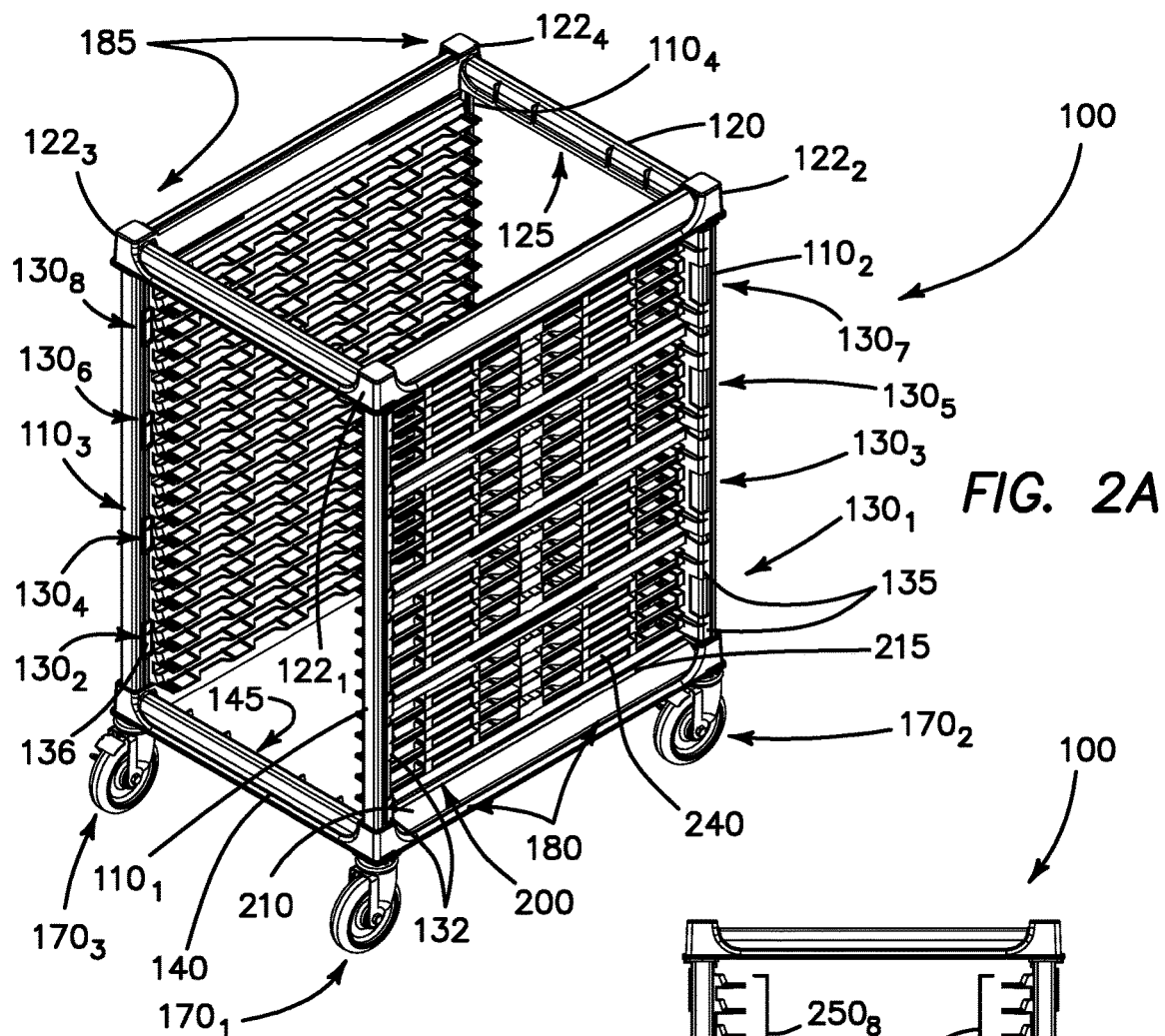
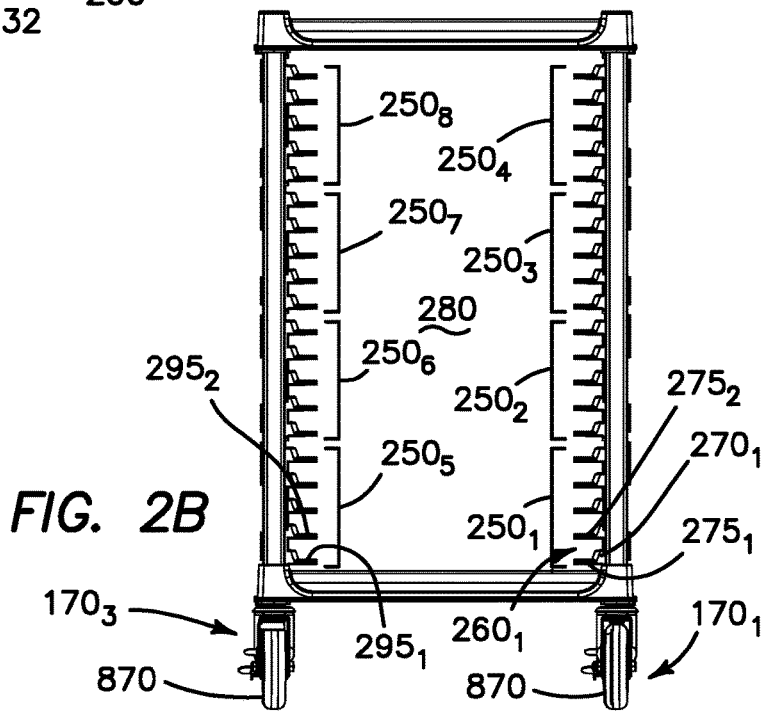

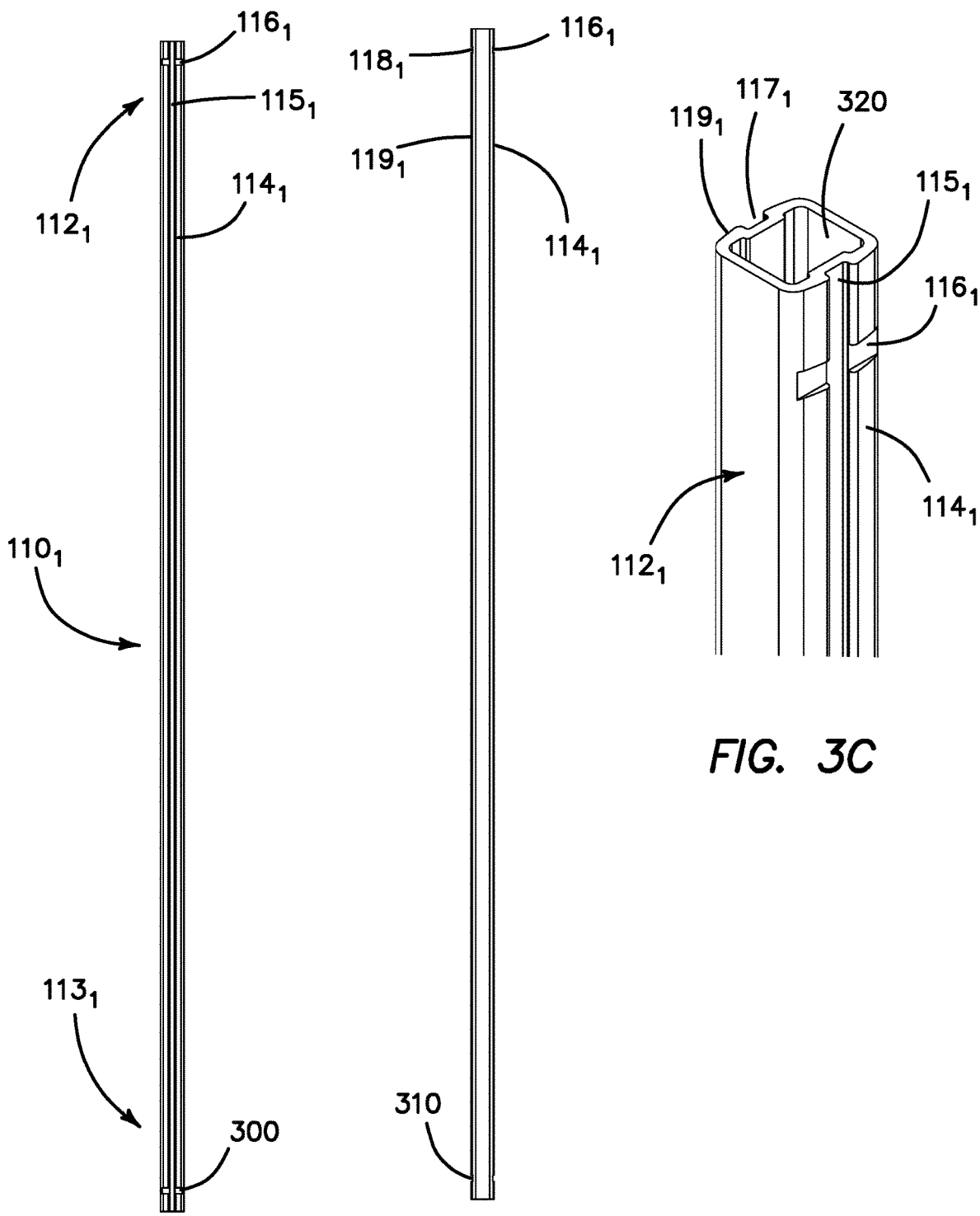

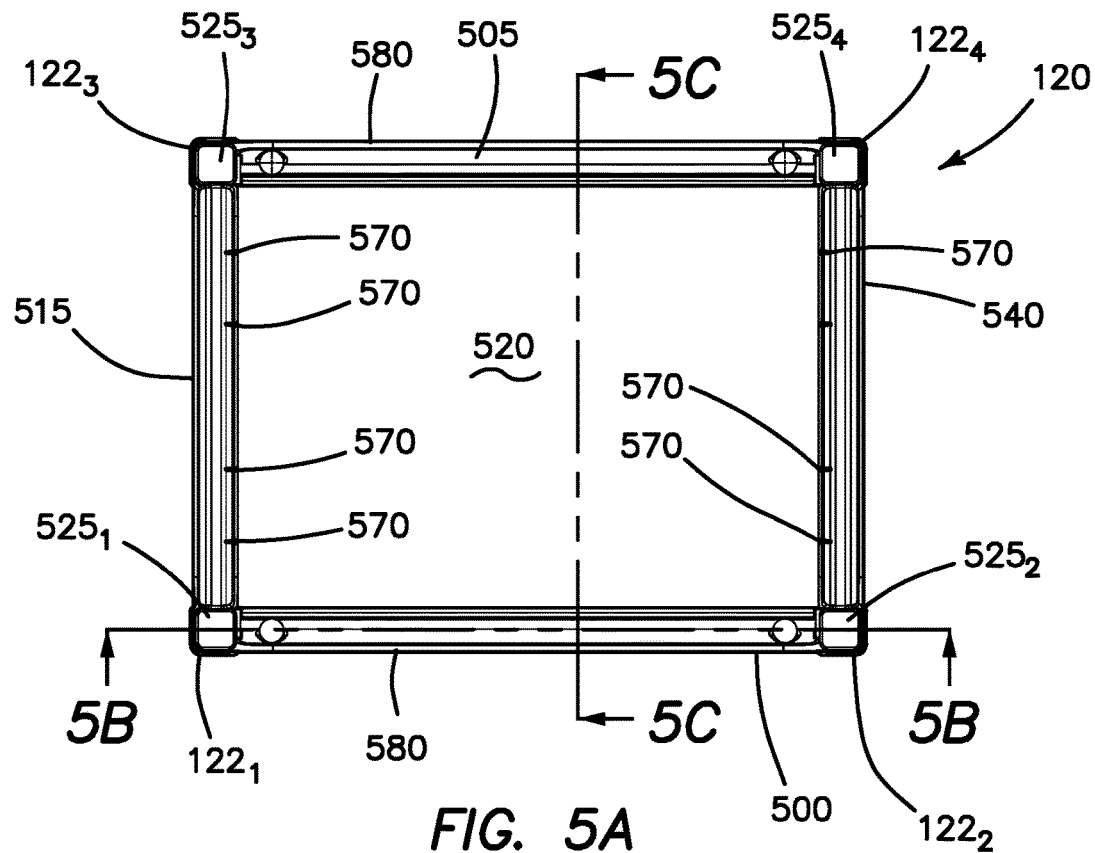
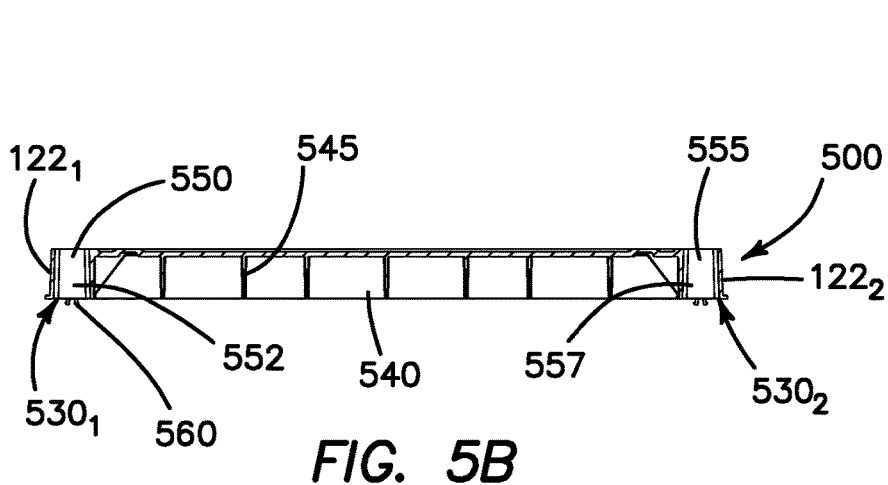 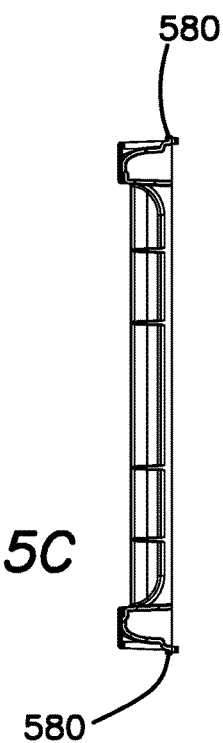
FIG. 5A
FIG. 5B
FIG. 5C

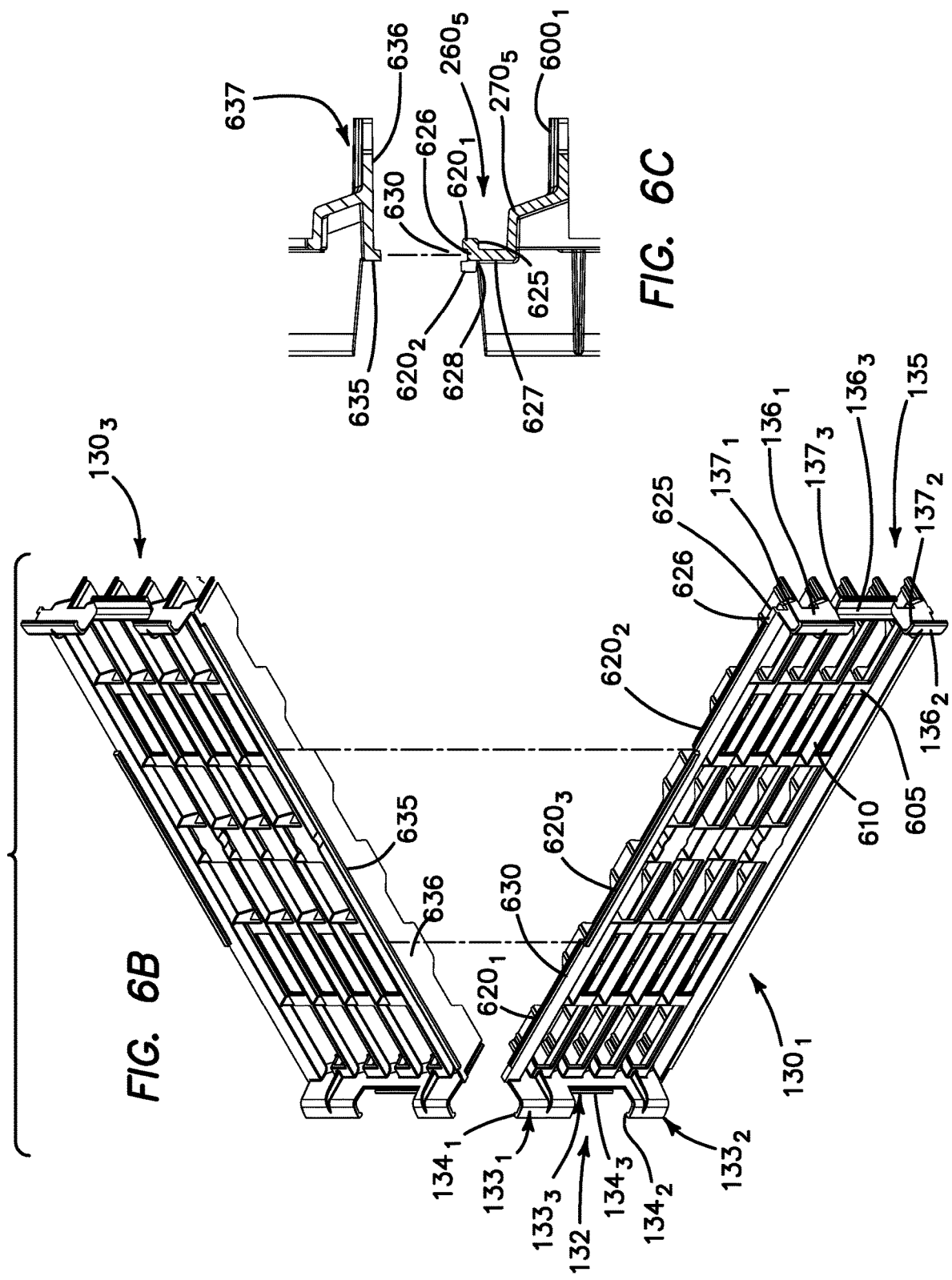

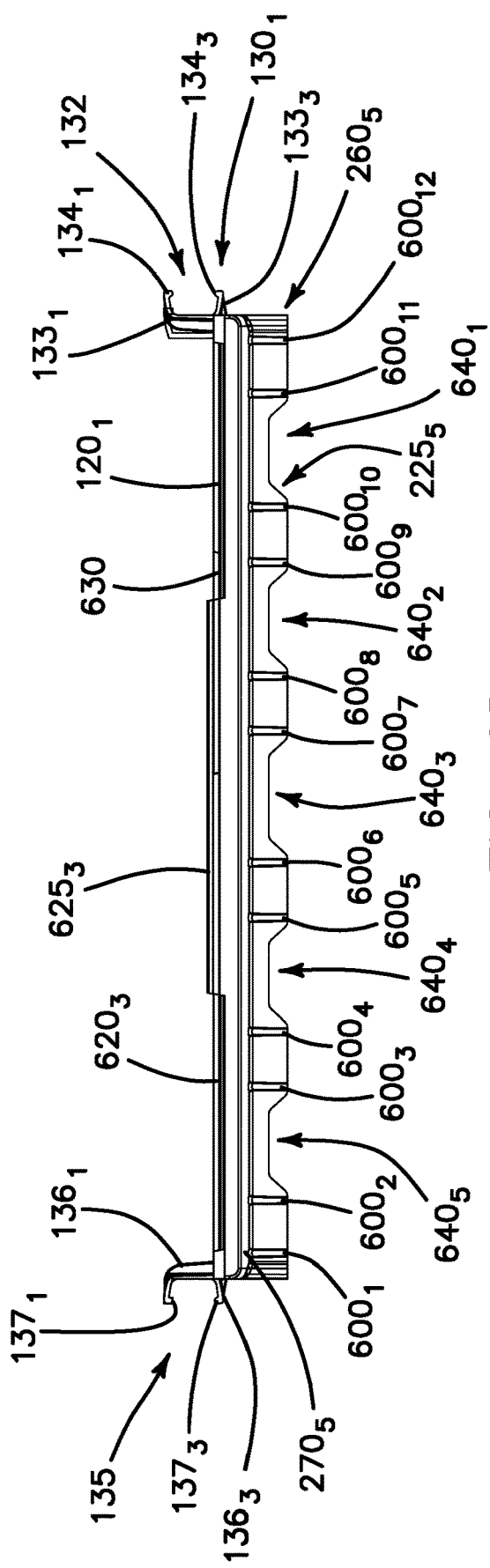
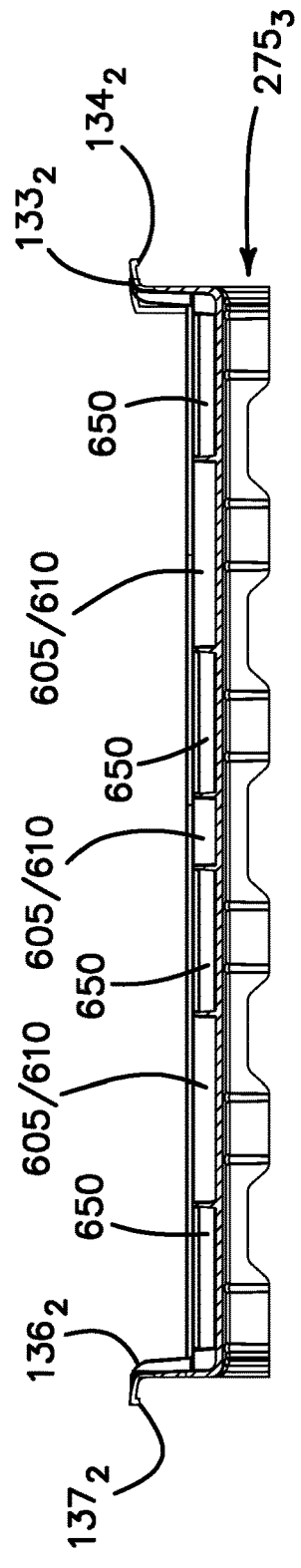
FIG. 6D
FIG. 6E

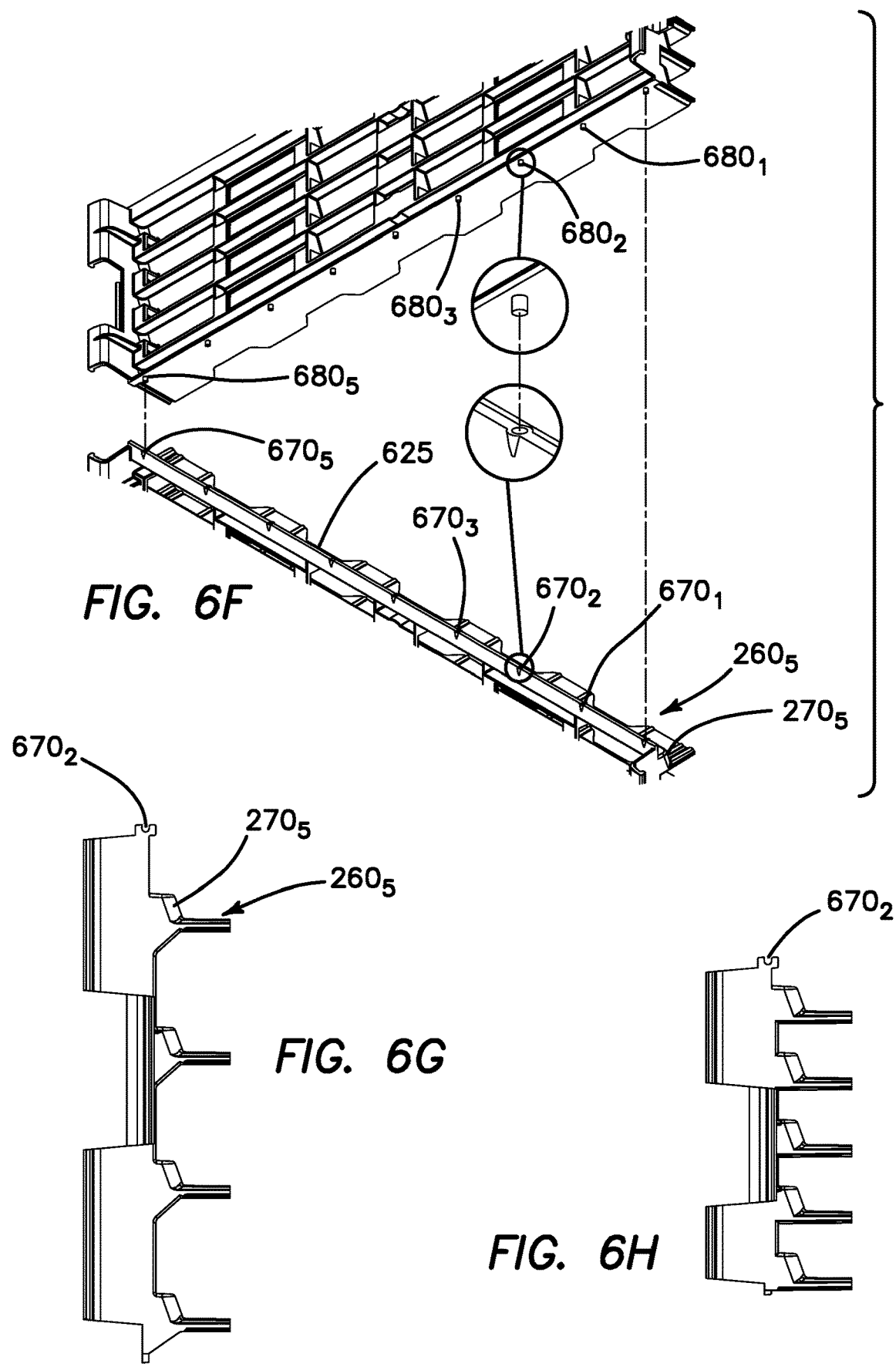

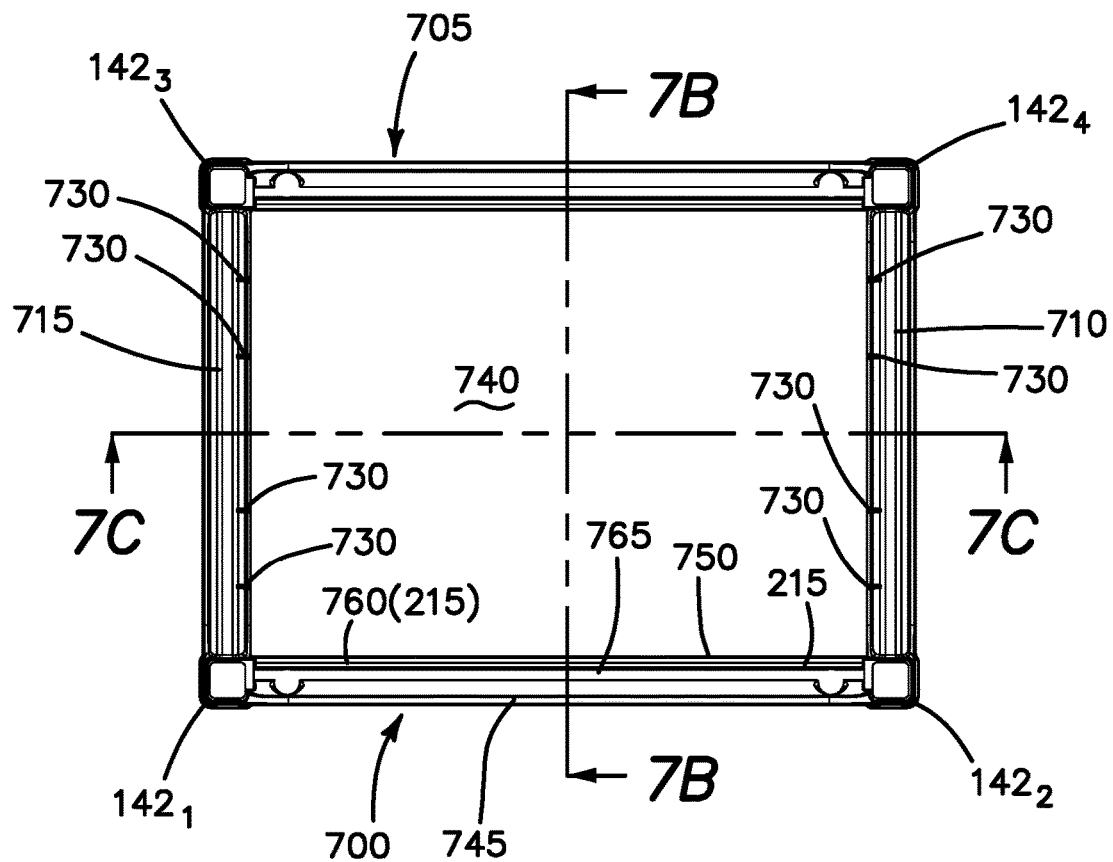
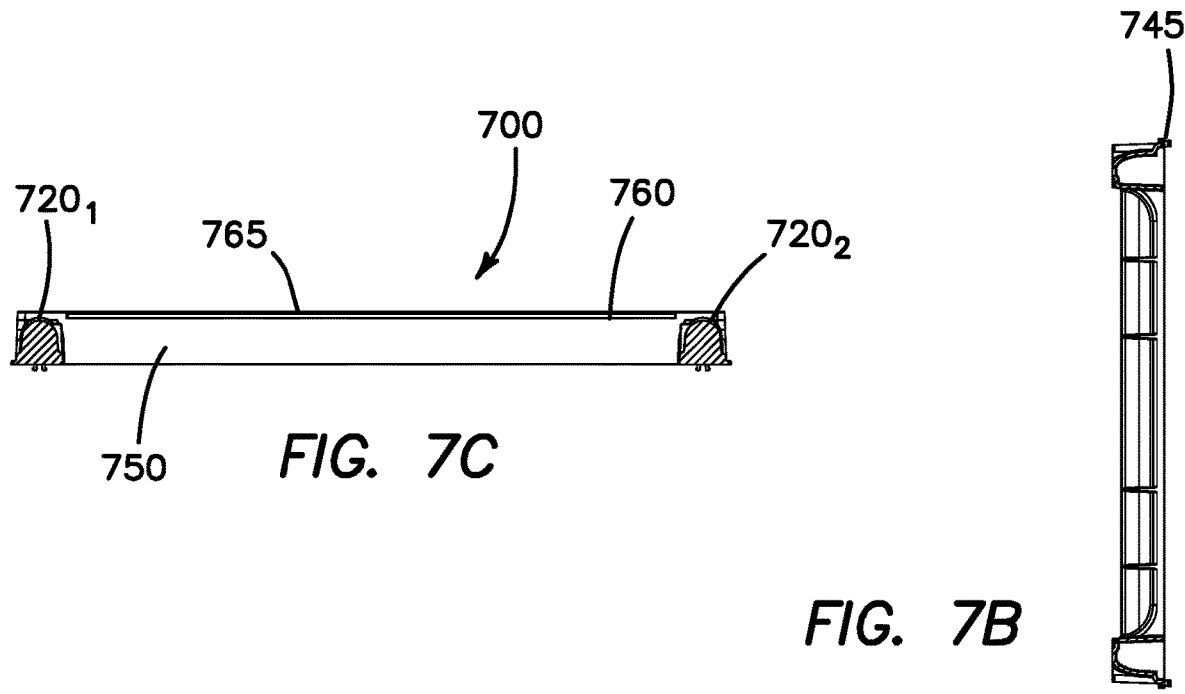
FIG. 7A
FIG. 7C
FIG. 7B

TRAY STORAGE SYSTEM

FIELD

Embodiments of the disclosure relate to the tray storage system. More specifically, one embodiment of the disclosure relates to a modular, tray storage system including one or more removable and interchangeable rail assemblies providing support for multiple trays.

GENERAL BACKGROUND

In many establishments, such as restaurants, bakeries and grocery stores for example, food items may be cooked in advance of customer orders. Examples of such food items include baked goods (e.g., breads, muffins, cookies, pies, etc.), which are baked on trays. After the food items are baked, the trays are removed from an oven and placed onto a food tray cart for cooling. During cooling, the baked goods remain temporarily on the trays until packaging and/or placement into display areas for sale.

Typically, conventional food tray carts are manufactured with permanent, metal shelving upon which the trays rest. Given the conventional food tray carts are designed with permanent shelving, workers are unable to customize their food tray carts based on need and to minimize costs. For instance, many conventional food tray carts are unable to add shelves as a greater amount of food storage is needed. Likewise, this monolithic structure (i.e., lack of modular components) makes the cleaning of these food tray carts extremely difficult, in contrast to a modular design that would allow certain modular components to be placed into a sink or even into a dishwasher for cleaning.

BRIEF DESCRIPTION OF THE DRAWINGS

Embodiments of the invention are illustrated by way of example and not by way of limitation in the figures of the accompanying drawings, in which like references indicate similar elements and in which:

FIG. 2A is an elevated, perspective view of the tray storage system of FIG. 1 after assembly.

FIG. 2B is a side perspective view of the assembled tray storage system of FIG. 2A.

FIG. 3A is a front perspective view of an exemplary embodiment of a post deployed as part of the tray storage system of FIG. 1.

FIG. 3B is a right side perspective view of the post of FIG. 3A.

FIG. 3C is an elevated perspective of a detailed view of an end portion of the post of FIGS. 3A-3B.

FIG. 5A is a top plan perspective of an exemplary embodiment of a top frame assembly deployed as part of the tray storage system of FIG. 1.

FIG. 5B is a cross-sectional view of the top frame assembly of FIG. 5A along line 5B-5B oriented in a longitudinal direction.

FIG. 5C is a cross-sectional view of the top frame assembly of FIG. 5A along line 5C-5C oriented in a lateral direction.

FIG. 6B is an elevated view of rail assembly of FIG. 6A mating with a neighboring rail assembly of similar construction.

FIG. 6C is a more detailed, cross-sectional view of the rail assembly of FIG. 6A mating with the neighboring rail assembly of similar construction.

FIG. 6D is a top plan view of the rail assembly of FIG. 6A.

FIG. 6E is a top plan view of an intermediary shelf of the rail assembly of FIG. 6A.

FIG. 6F is an elevated view of a second embodiment of a rail assembly mating with a neighboring rail assembly.

FIG. 6G is a cross-sectional view of the rail assembly of FIG. 6F illustrating a first spacing between shelves of the rail assembly.

FIG. 6H is a cross-sectional view of the rail assembly of FIG. 6F illustrating a second spacing lesser in size than the first spacing between shelves of the rail assembly.

FIG. 7A is a top plan perspective of an exemplary embodiment of a bottom frame assembly of FIG. 1.

FIG. 7B is a cross-sectional view of the bottom frame assembly of FIG. 7A along line 7B-7B oriented in a longitudinal direction.

FIG. 7C is a cross-sectional view of the bottom frame assembly of FIG. 7A along line 7C-7C oriented in a lateral direction.

DETAILED DESCRIPTION

Figure 1:
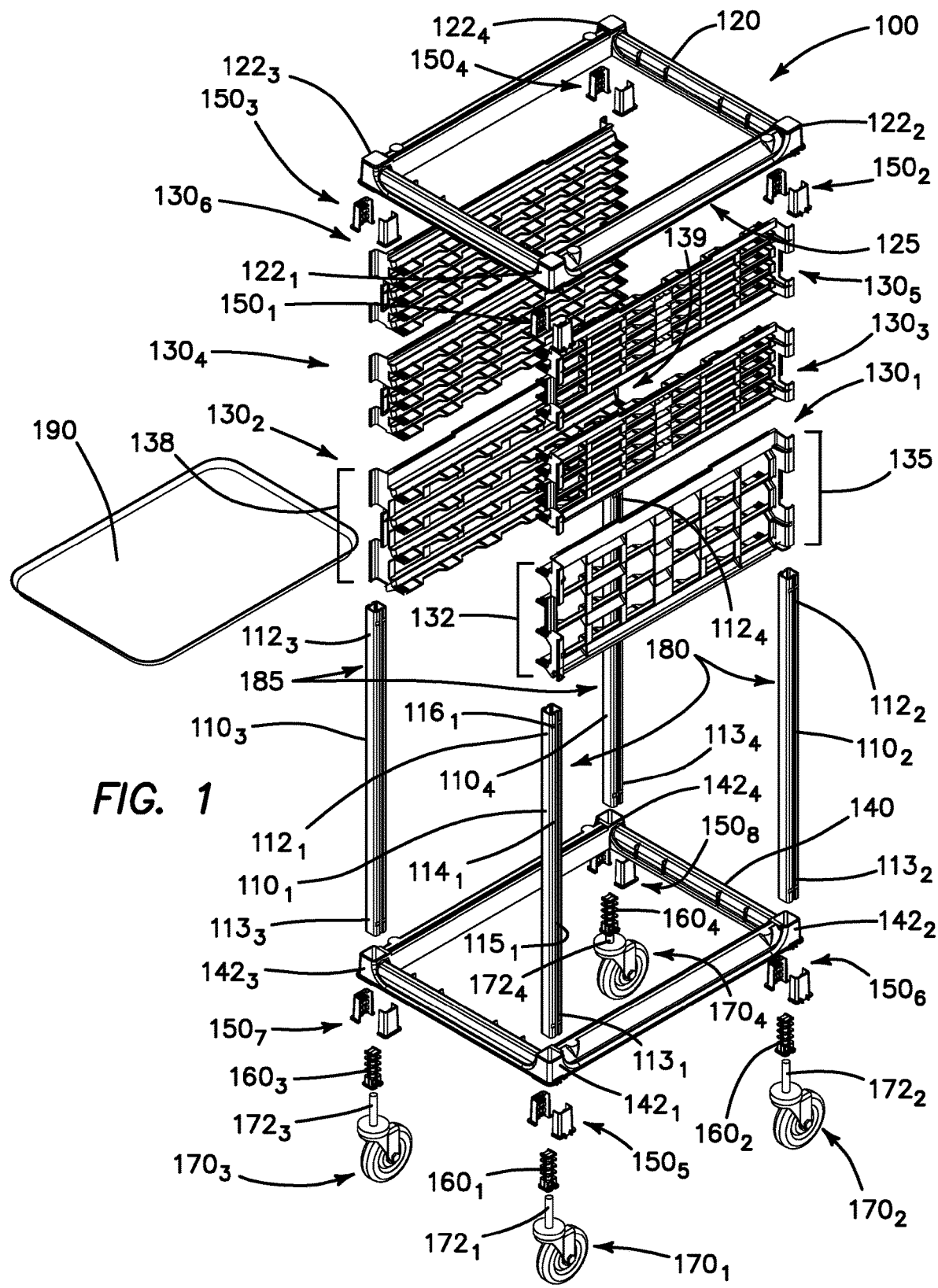
FIG. 1 is an exploded view of an exemplary embodiment of a modular, tray storage system.

Embodiments of the present disclosure generally relate to modular, tray storage system including at least a pair of removable and interchangeable rail assemblies, which are configured and positioned to support one or more food trays. A general overview of the tray storage system is described below.

I. OVERVIEW

According to one embodiment of the disclosure, the tray storage system features at least a pair of removable rail assemblies, each fabricated from injection molded plastic as a singular component, although it is contemplated that a rail assembly may be formed by coupling together multiple injection molded components. When installed as part of the tray storage system, each rail assembly features a plurality of support members that extend in a longitudinal (e.g., horizontal) direction and are laterally aligned with complementary support members from a different rail assembly. The rail assemblies may be stacked vertically to provide increased capacity.

As described below, the rail assemblies are configured for installation on the tray storage system to support rectangular trays. However, it is contemplated that the rail assemblies may be configured to support other types of polygon-shaped trays besides rectangular tray (e.g., trapezoidal, square, etc.), circular-shaped trays, or even oval shaped trays. In some circumstances, the shape and size of the components of the rail assemblies may need to be modified to support certain tray shapes and dimensions. However, such modifications do not depart from the broader spirit and scope of the invention directed to the modular nature and general construction of the rail assemblies as well as their interconnectivity with other components of the tray storage system as described below.

As part of a rail assembly, each support member includes a raised edge and a substantially level, shelf member extending outwardly from the raised edge toward an interior area of the tray storage system. This shelf member and a shelf member from a complementary support member of a different rail assembly are spaced apart and laterally aligned (i.e., positioned substantially planar to each other). Based on this orientation, collectively, the shelf members are able to receive and support a tray, as described below.

According to one embodiment of the disclosure, for each support member, the raised edge is positioned along the entire length of the shelf member (or at least a majority thereof) in order to restrict lateral movement of a tray when positioned on the shelf member. Additionally, multiple reinforcement members may be positioned on a backside of the raised edge. A first set of reinforcement members may be oriented in a latitudinal direction (e.g., an upward direction, including perpendicular to the longitudinal shelf member). Additionally, a second set of reinforcement members may be oriented in a longitudinal direction (e.g., horizontal, including in parallel with the shelf member). These reinforcement members are positioned to assist in countering additional downward forces being applied to the shelf members when a tray with food items is placed thereon. To provide lateral airflow, side vent areas are formed as openings between a top surface of the raised edge, the side surfaces of the reinforcement members, and bottom surfaces of the shelf members.

Besides the support and reinforcement members described above, each rail assembly further includes a plurality of post attachment members extending from its distal (opposite) longitudinal ends. More specifically, according to one embodiment, a first post attachment member extends outwardly from one or more of the raised edges (generally referenced as "raised edge(s)") of the rail assembly and is attached to a first vertically oriented post, which is secured to a top frame assembly and a bottom frame assembly of the tray storage system. Similarly, a second post attachment member extends outwardly from the raised edge(s) of the rail assembly in a direction opposite from the first post attachment member. The second post attachment member is attached to a second vertically oriented post also secured to the top frame assembly and the bottom frame assembly of the tray storage system.

According to one embodiment of the disclosure, the first post attachment member is configured to engage with a first channel formed vertically on a first outer surface of a first post. Additionally, the first post attachment member is configured to engage with a second channel formed vertically on a second outer surface of the first post. For this embodiment, the second outer surface of the first post may be a surface that is on an opposite side of the first post as the first outer surface. The second post attachment member may be coupled to the second post in the same manner, as described below.

As this invention is susceptible to embodiments of many different forms, it is intended that the disclosure is to be considered as an example of the principles of the invention and not intended to limit the invention to the specific embodiments shown and described. Furthermore, for clarity purposes, certain components are described in detail as a representative of all similar components within the tray storage system.

Herein, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

II. GENERAL ARCHITECTURE

Referring to FIG. 1, an exploded view of an exemplary embodiment of a modular, tray storage system 100 is shown. For this embodiment, the tray storage system 100 features a plurality of posts $110_1$-$110_4$, a top frame assembly 120, a plurality of rail assemblies $130_1$-$130_M$ (M≥2; M=6), and a bottom frame assembly 140. A first plurality of bifurcated collar connectors $150_1$-$150_4$ with a "wedge" shaped design (hereinafter "wedge connectors") may be attached to the first ends $112_1$-$112_4$ of the posts $110_1$-$110_4$ for subsequent insertion into recesses of corresponding top post connectors $122_1$-$122_4$ positioned at the corners of the top frame assembly 120. Responsive to insertion of the wedge connectors $150_1$-$150_4$ into the recesses, the plurality of posts $110_1$-$110_4$ are securely coupled to the top frame assembly 120.

Similarly, a second plurality of wedge connectors $150_5$-$150_8$ may be attached to the second ends $113_1$-$113_4$ of the posts $110_1$-$110_4$ for subsequent insertion into apertures formed in corresponding bottom post connectors $142_1$-$142_4$, which are positioned at the corners of the bottom frame assembly 140. Responsive to insertion of the wedge connectors $150_5$-$150_8$ into the apertures, the plurality of posts $110_1$-$110_4$ are securely coupled to the bottom frame assembly 140. Additionally, a corresponding plurality of inserts $160_1$-$160_4$ are inserted into cavities at the second ends $113_1$-$113_4$ of the posts $110_1$-$110_4$. These inserts $160_1$-$160_4$ are sized and shaped for an "upward" insertion through the apertures of the bottom frame assembly 140, insertion within the cavities of the posts $110_1$-$110_4$, and retention therein. The inserts $160_1$-$160_4$ are adapted to receive a plurality of casters $170_1$-$170_4$, where the plurality of casters $170_1$-$170_4$ are positioned at the corners of the bottom frame assembly 140 to provide the tray storage system 100 with mobility.

More specifically, according to one embodiment of the disclosure, the tray storage system 100 comprises the plurality of posts $110_1$-$110_4$. For clarity sake, a description of the first post $110_1$ is provided below, although the other posts $110_2$-$110_4$ have the same construction. Herein, the first post $110_1$ includes a first outer surface $114_1$ with a first central channel $115_1$ formed along a substantial length of the first outer surface $114_1$ in a vertical direction for use in retention of rail assemblies. A first notch $116_1$ traverses the first central channel $115_1$ in a horizontal direction for use in retention of a first bifurcated half of the wedge connector $150_1$. Similarly, as better illustrated in FIGS. 3B-3C, the first post $110_1$ further includes a second central channel $117_1$ formed along a substantial length of the second outer surface $119_1$ with a traversing second notch $118_1$ for use in retention of a second bifurcated half of the wedge connector $150_1$. According to this embodiment, the second outer surface $119_1$ is diametrically opposite to the first outer surface $114_1$.

Referring back to FIG. 1, in the assembly of the track storage system 100, the first plurality of wedge connectors $150_1$-$150_4$ are attached to the first ends $112_1$-$112_4$ of the posts $110_1$-$110_4$, respectively. Using the wedge connector $150_1$ as an illustrative example, this attachment may be conducted by attaching a first bifurcated half of the wedge connector $150_1$ to the first post $110_1$ and moving the first bifurcated half downward until a tab, protruding from an inner surface of the first bifurcated half of the wedge connector $150_1$, mates with a corresponding notch $116_1$ formed in the first post $110_1$ (see FIG. 4B). Also, a second bifurcated half of the wedge connector $150_1$ may be similarly attached to the first end $112_1$ of the first post $110_1$ and subsequently moved downward along on the first post $110_1$ until a tab mates with a corresponding notch $118_1$ of the first post $110_1$.

After attachment, the wedge connectors $150_1$-$150_4$ covering the outer periphery of the first ends $112_1$-$112_4$ of the posts $110_1$-$110_4$ are inserted into a correspond plurality of recesses located at corresponding top post connectors $122_1$-$122_4$ of the top frame assembly 120. As shown, the recesses are accessible via a bottom side 125 of the top frame assembly 120. According to one embodiment, the wedge connectors $150_1$-$150_4$ are formed with the shape and dimensions to snugly mate with the corresponding interior surfaces of these recesses. The wedge connectors $150_1$-$150_4$ may be secured to the top frame assembly 120 through a locking mechanism or by a pressure-based fitting, as described below and illustrated in FIGS. 4A-4C.

As further shown in FIG. 1, the plurality of wedge connectors $150_5$-$150_8$ are attached to the second ends $113_1$-$113_4$ of the posts $110_1$-$110_4$. Thereafter, the second ends $113_1$-$113_4$ of the posts $110_1$-$110_4$ (with the wedge connectors $150_5$-$150_8$) are inserted into the apertures within the bottom post connectors $142_1$-$142_4$ of the bottom frame assembly 140. Additionally, a plurality of inserts $160_1$-$160_4$ are inserted into cavities (see FIG. 3C) within the second ends $113_1$-$113_4$ of the posts $110_1$-$110_4$ via the apertures within the bottom post connectors $142_1$-$142_4$ of the bottom frame assembly 140. Each of the plurality of inserts $160_1$, . . . , or $160_4$ is constructed with a shape and dimension (e.g., same horizontal, cross-sectional shape as the cavity) to securely reside with a cavity formed in a corresponding second end $113_1$, . . . , or $113_4$ of the posts $110_1$, . . . , or $110_4$. After placement of the inserts $160_1$-$160_4$ into these cavities, vertical shafts $172_1$-$172_4$ of the casters $170_1$-$170_4$ are inserted into a bore of the inserts $160_1$-$160_4$ and attached thereto.

Prior to coupling the posts $110_1$-$110_4$ to the top frame assembly 120 and/or installing the wedge connectors $150_1$-$150_4$ to the outer periphery of the first ends $112_1$-$112_4$ of the posts $110_1$-$110_4$, at least one rail assembly of the plurality of rail assemblies $130_1$-$130_6$ is attached to both a first vertical post pairing 180 (i.e., posts $110_1$ and $110_2$) and a second vertical post pairing 185 (i.e., posts $110_3$ and $110_4$). As described below in greater detail, this configuration enables a rail assembly (e.g., rail assembly $130_1$) attached to the first vertical post pairing 180 to provide elevated support to one side of a tray 190 while a complementary rail assembly (e.g., rail assembly $130_2$) attached to the second vertical post pairing 185 provides elevated support to another (opposite) side of the tray 190.

According to one embodiment of the disclosure, as shown in FIG. 1, a first rail assembly $130_1$ is coupled to the first vertical post pairing 180 by post attachment members 132 and 135 of the first rail assembly $130_1$. In general, the first post attachment member 132 includes (i) one or more connection arms generally extending in a longitudinal direction with each connection arm having a fastening portion extending in a lateral direction toward the outer surface $114_1$ of the first post $110_1$ and (ii) one or more connection arms generally extending in the longitudinal direction with each connection arm having a fastening portion extending in a lateral direction toward the outer surface $119_1$ of the first post $110_1$. A more detail illustration of these components for a rail assembly (e.g., the first rail assembly $130_1$) are illustrated in FIG. 6B and described below.

Based on this architecture, the fastening portions of the first post attachment member are configured to slideably engage with the channels $115_1$/$117_1$ formed into the post $110_1$. By at least one fastening portion substantially residing within the channel $115_1$ and at least one fastening portion substantially residing within the channel $117_1$, when the first rail assembly $130_1$ is attached to the first post $110_1$, the first rail assembly $130_1$ is restricted in movement in both the longitudinal and lateral directions. Movement in the latitudinal (vertical) direction is available. The fastening portions of the post attachment member 135 are configured to slideably engage with the channels $115_2$/$117_2$ formed into the post $110_2$ in a similar manner.

Additionally, a second rail assembly $130_2$ is coupled to the second vertical post pairing 185 by post attachment members 138 and 139. In particular, the second rail assembly $130_2$ is attached to the second vertical post pairing 185 in a manner similar to the first rail assembly $130_1$ being attached to the first virtual post pairing 180. Identical in construction as the post attachment member 135 of the first rail assembly $130_1$, the post attachment member 138 of the second rail assembly $130_2$ includes fastening portions that slideably engage both channels $115_3$ and $117_3$ formed into the post $110_3$. Additionally, although not shown in detail, fastening portions of the post attachment member 139, which is identical to post attachment member 132, are configured to slideably engage with the channels $115_4$ and $117_4$ formed into the post $110_4$.

Referring still to FIG. 1, each rail assembly (e.g., rail assembly $130_1$-$130_6$) provides shelf members to partially support the trays. According to one embodiment, one type of rail assembly (e.g., rail assemblies $130_3$-$130_6$) are configured to partially support five (5) trays with 1½-inch spacing between shelf members while another type of rail assembly (e.g., rail assemblies $130_1$-$130_2$) are configured to support four (4) trays with 3-inch spacing between shelf members.

Independent on the type of rail assembly, each rail assembly is configured with an interlocking construction that provides the stacked rail assemblies with lateral stability when vertically stacked together, as described in more detail below and illustrated in FIGS. 6B-6C. As a result, the rail assemblies may be interchangeable, which allows the tray storage system 100 to include different types of rail assemblies as shown in FIG. 1 or the same type of rail assemblies as shown in FIGS. 2A-2B.

Referring now to FIG. 2A, an elevated perspective view of the tray storage system 100 after assembly is shown. Herein, the posts $110_1$-$110_4$ are coupled to both (i) the top frame assembly 120 via recesses (not shown) within the top post connectors $122_1$-$122_4$ accessed from the bottom side 125 of the top frame assembly 120 and (ii) the bottom frame assembly 140 via apertures (not shown) within the bottom post connectors $142_1$-$142_4$ located at the corners and accessible via a top side 145 of the bottom frame assembly 140. Casters $170_1$-$170_4$ are connected to the bottom frame assembly 140 and secured thereto by inserts (not shown) secured within the posts $110_1$-$110_4$. As shown for this particular embodiment, four vertically aligned rail assemblies $130_1$, $130_3$, $130_5$ and $130_7$ are coupled to the first vertical post pairing 180 (e.g., for rail assembly $130_1$, post attachment member 132 is connected to the first post $110_1$ and post attachment member 135 is connected to the second post $110_2$) and four complementary rail assemblies $130_2$, $130_4$, $130_6$ and $130_8$ are coupled to the second vertical post pairing 185 (e.g., for rail assembly $130_2$, post attachment member 138 are connected to the third post $110_3$ and post attachment member 139 are connected to the fourth post $110_4$).

According to one embodiment of the disclosure, the first rail assembly $130_1$ and the second rail assembly $130_2$ engage with a top surface 200 of the bottom frame assembly 140. In particular, a first segment 210 of the bottom frame assembly 140 includes a ridge 215, where a protruding member extending from the bottom surface of the first rail assembly $130_1$ resides immediately adjacent to the ridge 215.

Additionally, rail assemblies $130_3$, $130_5$ and $130_7$ are vertically aligned with the first rail assembly $130_1$ while rail assemblies $130_4$, $130_6$ and $130_8$ are vertically aligned with the second rail assembly $130_2$. As an illustrative example, considering the architecture associated with the rail assemblies $130_1$, $130_3$, $130_5$ and $130_7$ coupled to the first vertical post pairing 180, the third rail assembly $130_3$ is configured to interlock with the first rail assembly $130_1$ and the third rail assembly $130_5$. More specifically, where a tongue and channel engagement scheme is utilized between rail assemblies, as shown in more detail in FIGS. 6B-6C, a bottom surface of the third rail assembly $130_3$ includes a protruding member (tongue) that is positioned to reside within a continuous (uninterrupted) spacing formed by offset flanges positioned on a top portion of the first rail assembly $130_1$. The same architecture applies as to the interlocking relationship between the third and fifth rail assemblies $130_3$ and $130_5$ and the fifth and seventh rail assemblies $130_5$ and $130_7$. The top frame assembly 120 may not engage with the seventh rail assembly $130_7$.

According to one embodiment of the disclosure, each rail assembly $130_1$-$130_8$ (e.g., rail assembly $130_1$) includes one or more reinforcement members 240 positioned on a backside of the rail assembly $130_1$. The reinforcement members 240 may be oriented latitudinally (e.g., vertically), and in some cases longitudinally (e.g., horizontally) being in the same direction as the first segment 210 of the bottom frame assembly 140.

Referring to FIG. 2B, a side perspective view of the assembled tray storage system 100 of FIG. 2A is shown. Herein, each rail assembly $130_1$-$130_8$ features a predetermined shelving configuration $250_1$-$250_8$, respectively. For this embodiment, as the architecture of each shelving configuration $250_1$-$250_8$ is identical, for clarify sake, a first shelving configuration $250_1$ is described. According to this embodiment of the disclosure, the shelving configuration $250_1$ features a plurality of support member $260_1$-$260_N$ (N≥4; N=5 for this embodiment), each support member (e.g., support member $260_1$) includes a raised edge $270_1$ and a substantially planar, shelf member $275_1$ outwardly extending from the raised edge $270_1$ toward an interior area 280 of the tray storage system 100. Herein, the raised edge $270_1$ is positioned along a substantial length of the shelf member $275_1$ in order to impede lateral movement of a tray when positioned on the shelf member $275_1$ and its complementary shelf member $295_1$ being part of the second rail assembly $130_2$.

Stated differently, the pair of shelf members $275_1$ and $295_1$ from different, aligned (laterally) rail assemblies $130_2$ and $130_2$ are oriented to receive and support a tray slid onto these shelf members $275_1$ and $295_1$. This allows for placement of the trays in an area bounded by (i) the bottom surfaces of neighboring shelf member $275_2$ and $295_2$ and (ii) the top surfaces of shelf members $275_1$ and $295_1$, and (iii) an inner surface of the raised edges $270_1$ and $290_1$. Although not shown, the casters $170_1$ and $170_3$ may include a locking mechanism to allow the wheels 870 to be locked to prevent movement of the tray storage system 100 or when unlocked to allow the tray storage system 100 to be mobile.

Referring now to FIG. 3A, a front perspective view of an exemplary embodiment of a post (e.g., post $110_1$) deployed as part of the tray storage system 100 of FIG. 1 is shown. The post $110_1$ is comprised of plastic or plastic composites and is fabricated by the known process of pultrusion. Briefly, the process of pultrusion includes a plurality of strands of fiberglass or other suitable material being extruded from a plurality of rovings. The strands are brought together with other materials such as mats and are placed in a resin bath or are otherwise impregnated with resin and other substances that bind the roving strands together. The resin infused strands are then mechanically pulled through a forming die which forms the fiberglass to a predetermined shape. After being pulled, heated, or cured, the pultruded posts are cut to a desired length.

Additionally, according to one embodiment of the disclosure, the first channel $115_1$ may be formed in the first outer surface $114_1$ of the post $110_1$ by etching or during the pultrusion process. Herein, the first channel $115_1$ extends from the first end $112_1$ (near top) of the post $110_1$ to the second end $113_1$ (near bottom) of the post $110_1$. Also, the first notch $116_1$ traversing the first channel $115_1$ may be placed at the first end $112_1$, which is used to secure the wedge connectors $150_1$ to the first post $110_1$ as illustrated in FIG. 1. Similarly, a third notch 300 traversing the first channel $115_1$ may be placed at the second end $113_1$, which is used to secure the wedge connector $150_5$.

As shown in FIGS. 3B-3C, a second channel $117_1$ is formed in a second outer surface $119_1$ of the post $110_1$, where the second outer surface $119_1$ is diametrically opposite to the first outer surface $114_1$. Similar to the first channel $115_1$, the second channel $117_1$ extends from the first end $112_1$ (near top) of the post $110_1$ to the second end $113_1$ (near bottom) of the post $110_1$. Also, the second notch $118_1$ traversing the second channel $117_1$ may be placed at the first end $112_1$ to assist in securing the wedge connector $150_1$ while a fourth notch 310 also traversing the second channel $117_1$ may be placed at the second end $113_1$ to assist in securing the wedge connector $150_5$ to the first post $110_1$ as also illustrated in FIG. 1.

Referring now to FIG. 3C, a more detailed illustration of the first end $112_1$ of the first post $110_1$ is shown. The first post $110_1$ features a conduit construction, with a general I-shaped cross-section cavity 320 produced in part by both the first channel $115_1$ formed along the first outer surface $116_1$ and the second channel $117_1$ formed along the second outer surface $118_1$. This cavity 320 allows the insert $160_1$ to be inserted and secured to the first post $110_1$ upon passing through an aperture provided at the bottom post connector $142_1$ of the bottom frame assembly 140 as shown in FIG. 1.

Figure 4A:
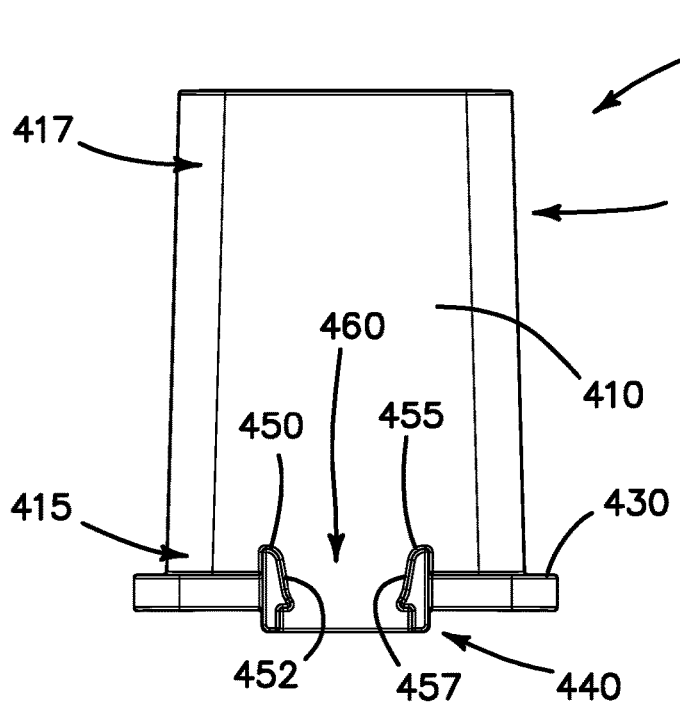
FIG. 4A is a front perspective view of an exemplary first embodiment of a wedge-shaped connector deployed as part of the tray storage system of FIG. 1.
Figure 4B:
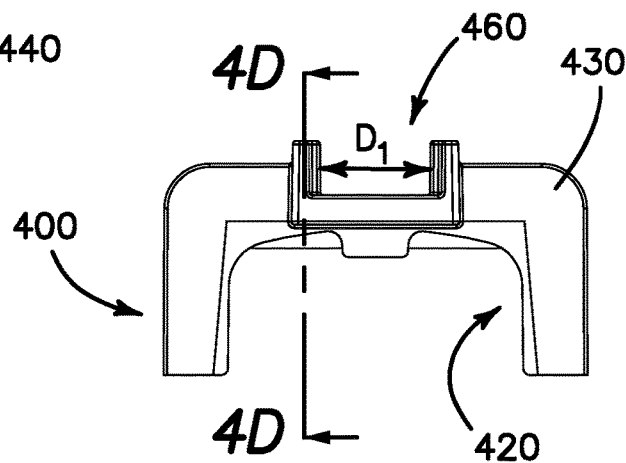
FIG. 4B is an upward perspective view of an outer half of the wedge-shaped connector of FIG. 4A.

Referring now to FIG. 4A, a front perspective view of an exemplary first embodiment of a wedge-shaped connector $150_1$ deployed as part of the tray storage system 100 of FIG. 1 is shown. The wedge-shaped connector $150_1$ operates as a bifurcated collar including a pair of wedge-shaped halves, specifically an outside half 400 as shown in FIG. 4A and an inside half 405 being identical to the outside half 400 as shown in FIG. 1. The outside half 400 comprises a body 410 with a substantially U-shaped cross section 420 as shown in FIG. 4B with a seat 430 disposed around an outside surface of a bottom portion 415 of the body 410. Defined approximate to the middle of the seat 430 is a locking mechanism 440. The locking mechanism 440 is an extension of the body 410 and comprises a pair of stops 450 and 452 disposed on either side of the locking mechanism 440.

Herein, an opening 460 between a sloped area 452 of the first stop 450 and a sloped area 457 of the second stop 455, as represented by a distance "D1," is less than the distance between distal ends of a resilient catch 560 of FIG. 5B, which is seated on its outer edge of the top post connector $122_1$. Accordingly, as the wedge-shaped connector $150_1$ is inserted into a recess (e.g., recess $530_1$ of FIG. 5A) within the top post connector $122_1$ of the top frame assembly 120, the resilient catch 560 would be compressed during travel along the sloped areas 452/457 of the stops 450/455. Upon clearing the opening 460, the resilient catch 560 returns to its uncompressed size causing the distal ends to extend under the sloped areas 452 and 457. Hence, the outside half 400 of the wedge-shaped connector $150_1$ is secured to the top frame assembly 120.

Figure 4D:
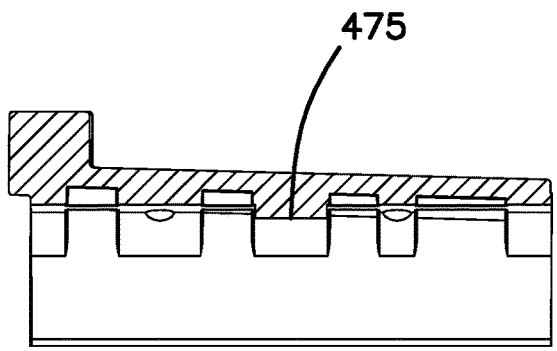
FIG. 4D is a cross-sectional view from a bottom area toward a top area of the wedge-shaped connector of FIG. 4B.
Figure 4C:
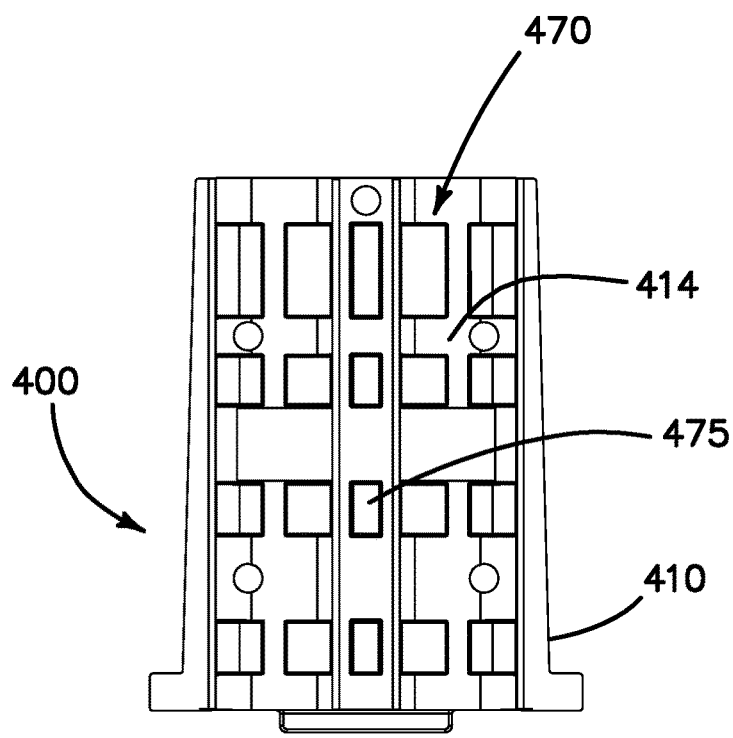
FIG. 4C is an exemplary embodiment of an inner surface of the outer half of the wedge-shaped connector of FIG. 4B.

As shown in FIGS. 4C-4D, an inner surface of the body 410 of the outer half 400 includes one or more protrusions 470 being raised portion(s) of an inner surface 414 of the body 410. At least some of the protrusions 470, such as tab 475 for example, is sized and shaped to fit into the first notch $116_1$ of the first end $112_1$ of the first post $110_1$. Similarly, although not shown, an inner surface of the body of the inside half 405 of the wedge connector $150_1$ is sized and shaped to engage with the notch $118_1$ formed in the second outer surface $119_1$ of the first end $112_1$.

Referring now to FIG. 1, FIG. 4A and FIG. 5B, each of the wedge-shaped halves forming the wedge connector $150_1$ is mounted on the first post $110_1$ and includes a bottom area (e.g., bottom portion 415 of the outside half 400 toward the seat 430 that is slightly larger in width than a top portion 415 of the body 410. Hence, as the recess of the top post connector $122_1$ of the top frame assembly 110 (e.g., the recess $530_1$ of FIG. 5B) engages with the wedge connector $150_1$, the recess $530_1$ fully accommodates the wedge connector $150_1$ and the post $110_1$. Due to the tapered or wedged shape of both the recess $530_1$ and the corresponding wedge connector $150_1$, a force is created on both wedge halves as the top post connector $122_1$ is slid down, pushing them into the first post $110_1$ and the catch 560 interlocks with stops 450 and 455 of the locking mechanism 440. The net effect then is a squeezing coupling force similar to that utilized in the two halves 400 and 405 of the wedge connector $150_1$ disclosed above, which produces an increasingly larger force directed towards the center of the post $110_1$ as the wedge connector $150_1$ is further forced into the recess $530_1$ of the top frame assembly 120. This inward force thus creates a corresponding and equal reactive outward force which keeps both the wedge connector $150_1$ and top post connector $122_1$ positioned at the corners of the top frame assembly 120 to be firmly locked into position. This process may be repeated for the other top post connectors $122_2$-$122_4$ of the top frame assembly 120 with respect to the other wedge connectors $150_2$-$150_4$, respectively.

Figure 4E:
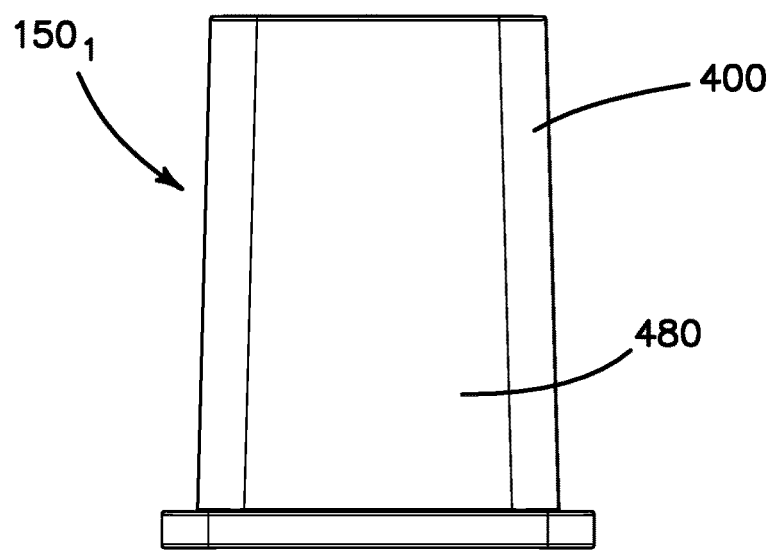
FIG. 4E is a front perspective view of an exemplary second embodiment of a wedge-shaped connector of FIG. 1.

Referring to FIG. 4E, a front perspective view of an exemplary second embodiment of the outer half 400 of the wedge-shaped connector $150_1$ is shown. Herein, the wedge-shaped connector $150_1$ does not feature the locking mechanism 440 as shown in FIG. 4A. Instead, the body 480 of the wedge-shaped connector $150_1$ is specific sized and shaped for placement and retention in the recess $530_1$ of the top frame assembly 120.

Referring now to FIG. 5A, a top plan perspective of an exemplary embodiment of the top frame assembly 120 deployed as part of the tray storage system 100 is shown. The top frame assembly 120 includes a pair of longitudinal segments 500 and 505 connected to a pair of lateral segments 510 and 515 to collectively form a rectangular member with an open interior area 520. A top post connector $122_1$-$122_4$ is positioned at the intersection between each longitudinal segment 500 or 505 and each lateral segment 510 or 515, representing corners of the top frame assembly 120. Each of the top post connectors $122_1$-$122_4$ features a cap $525_1$-$525_4$ positioned over recesses $530_1$-$530_4$ configured to receive posts $110_1$-$110_4$.

Referring now to FIG. 5B, a cross sectional view of a first longitudinal segment 500 of the top frame assembly 120 is shown. Herein, the first longitudinal segment 500 comprises a straight connector piece 540 with the top post connector $122_1$-$122_2$ disposed at both ends. As shown, the straight connector piece 540 is hollow, including support walls 545 for fortification and the top post connectors $122_1$-$122_2$ include the recesses $530_1$-$530_2$ accessible from underneath. These recesses $530_1$-$530_2$ are substantially wedged shaped, where top portions 550 and 555 of the recesses $530_1$-$530_2$ are narrower in width than the width of the bottom portions 552 and 557 of the recesses $530_1$-$530_2$.

As described above, upon view of the first longitudinal segment 500 illustrated in FIG. 5B, each of the top post connectors $122_1$-$122_2$ further features the resilient catch 560 seated on its outer edge. The resilient catch 560 is positioned so that the distal portion of the catch 560 is disposed beneath the rest of the top post connector $122_1$.

As an alternative embodiment, if the wedge connectors $150_1$-$150_4$ are not utilized, it is contemplated that each recess $530_1$-$530_4$ associated with each top post connector $122_1$-$122_4$ would include a general I-beam shaped recess configuration sized and shaped to receive and mate with the corresponding I-beam cross section configuration of each post $110_1$-$110_4$.

Different than the bottom frame assembly 140 of FIG. 1, each top post connector $122_1$-$122_2$ is adapted with the caps $525_1$-$525_4$ to preclude contaminants from entering into the cavities of the posts $110_1$-$110_4$. As further shown in FIG. 5A, a plurality of corbels 570 are positioned along interior edges of the lateral segments 510 and 515 of the top frame assembly 120, resting on an inner ridge (not shown) along a perimeter of these interior edges. These corbels 570 are spaced apart and extend into the interior area 520 to support a tray or a similarly sized object. The tray (or object) is positioned on the top frame assembly 120 to prevent contaminants from directly falling onto food items on trays positioned on the topmost support member (e.g., topmost support members of rail assembly $130_7$ and/or rail assembly $130_8$ of FIGS. 2A-2B). While the lateral segments 510 and 515 provide a plurality of corbels 570, each of the longitudinal segments 500 and 505 include a flange 580 formed along outer edge of these segments 500 and 505 to provide lateral reinforcement as shown in FIG. 5C.

Figure 6A:
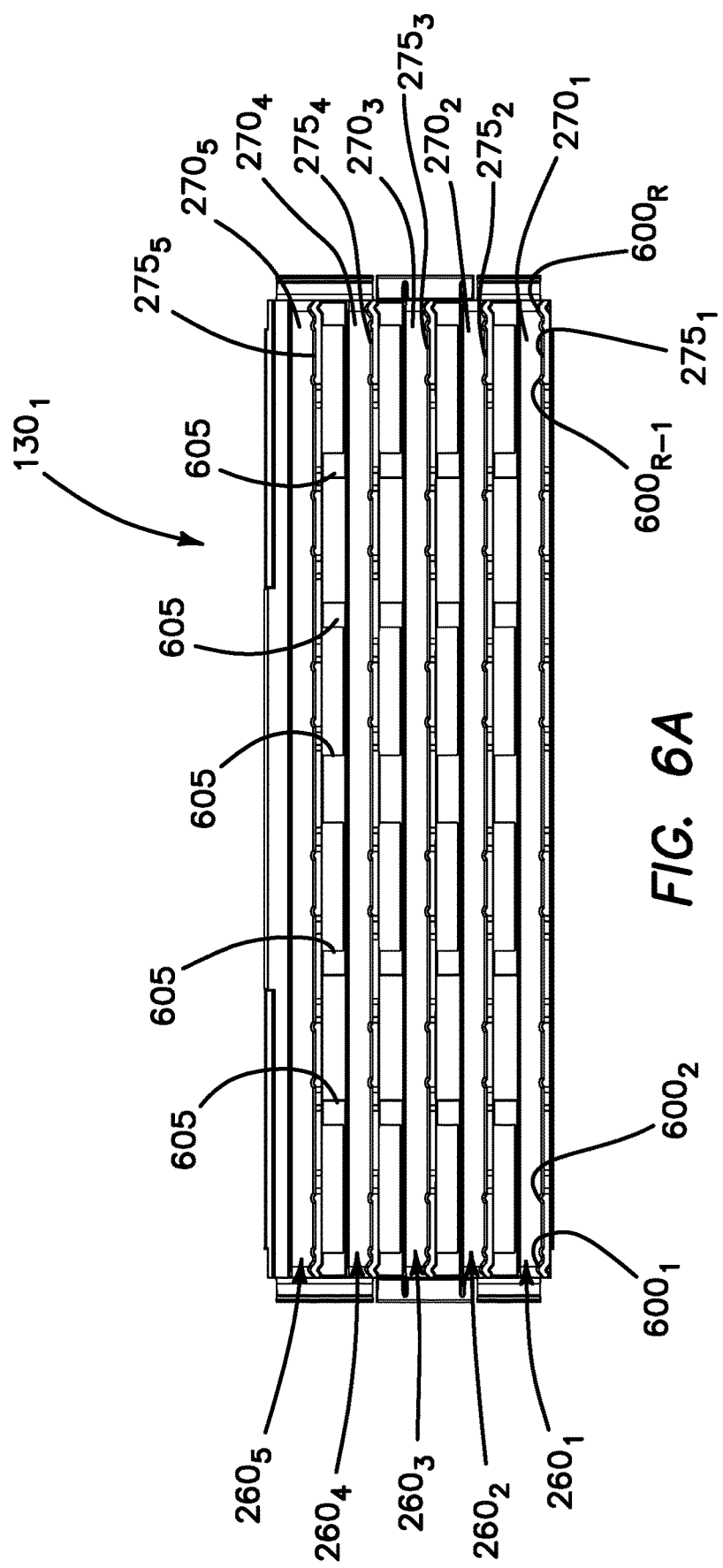
FIG. 6A is a side perspective view of a first exemplary embodiment of a modular rail assembly deployed as part of the tray storage system of FIG. 1.

Referring now to FIG. 6A, a side perspective view of a first embodiment of a modular rail assembly (e.g., first rail assembly $130_1$) deployed as part of the tray storage system 100 of FIG. 2A is shown. Herein, for this embodiment, the first rail assembly $130_1$ includes a plurality of support members $260_1$-$260_5$. Each support members $260_1$-$260_5$ is positioned as part of the rail assembly $130_1$ in a longitudinal direction and includes a raised edge $270_1$-$270_5$ and a shelf member $275_1$-$275_5$, respectively. The raised edges $270_1$-$270_5$ restricts lateral movement of the tray outside of the first rail assembly $130_1$ while the shelf members $275_1$-$275_5$ provide support for a tray placed within the tray storage system 100. Each shelf member $275_1$-$275_5$ is separated from each other by a prescribed distance, such as one and one-half (1½) inches (see rail assembly $130_1$ of FIG. 2A) or approximately three (3) inches (see rail assembly $130_1$ of FIG. 1) causing the first rail assembly $130_1$ to reduce the number of support members $275_1$-$275_4$ to maintain the overall height of the first rail assembly $130_1$.

Using shelf member $275_1$ as an illustrative example of the construction for all of the shelf members $275_1$-$275_5$, the shelf member $275_1$ includes a plurality of ribs $600_1$-$600_R$ (R≥2) positioned on a top surface of the substantially planar, shelf members $275_1$. According to one embodiment of the disclosure, at least two of the plurality of ribs $600_1$-$600_R$, illustrated as ribs $600_1$ and $600_R$, are formed with a greater height than the remaining ribs $600_2$-$600_{R-1}$. Ribs $600_1$ and $600_R$ are positioned at the distal ends of the shelf member $275_1$ to require both longitudinal and latitudinal forces to be applied to a tray, when resting on the shelf members $275_1$, for removal of the tray from the tray support system 100. This prevents the tray from being dislodged accidentally, especially during wheeled movement of the tray storage system 100 from one location to another. The ribs $600_2$-$600_{R-1}$ are positioned to maintain the tray, especially a tray out of the oven, from directly contacting the planar portion of the shelf member $275_1$ and potentially damaging, from the excessive heat, its structural integrity.

According to one embodiment of the disclosure, each of the plurality of ribs $600_1$-$600_R$ (or a subset of these ribs such as ribs $600_2$-$600_{R-1}$) may compose the same material as the shelf member $275_1$ or, where multi-material injection molding is available, may be composed of a material having better heat reflective properties than the plastic material (e.g., polypropylene) used in the formation of the planar portion of the shelf members $275_1$. Examples of materials with better heat reflective properties include, but are not limited or restricted to the following: fluoropolymers, silicone polymer, etc. As another embodiment of the disclosure, each of the plurality of ribs $600_1$-$600_R$ may be coated with the material having better heat reflective properties than the plastic material (e.g., polypropylene) used in the formation of the shelf members $275_1$. This coating may be applied during or after manufacturing of the rail assembly $130_1$.

As further shown in FIG. 6A, the first rail assembly $130_1$ further features one or more reinforcement members 605 (also labeled as member 240 of FIG. 2A), which are provided as structural supports for the support members $260_1$-$260_5$ and are oriented latitudinally (e.g., vertically in a perpendicular or angled orientation, etc.) to traverse the raised edges $270_1$-$270_5$ and shelf member $275_1$-$275_5$. The reinforcement members 605 are formed during injection molding as part of the first rail assembly $130_1$ designed to counter additional downward forces applied the shelf members $275_1$-$275_5$ when trays with food items are placed thereon. It is contemplated that additional reinforcement members 610 may be oriented in the longitudinal direction between the reinforcement members 605 as shown in FIG. 6B.

Referring now to FIG. 6B, an elevated view of the first rail assembly $130_1$ of FIG. 6A interlocking with a neighboring rail assembly (e.g., second rail assembly $130_3$) is shown. It is contemplated that each of the rail assemblies $130_1$-$130_6$ of FIG. 1 and the rail assemblies $130_1$-$130_8$ of FIGS. 2A-2B have identical construction, but for clarity sake, the construction of the first rail assembly $130_1$ and/or the interlocking relationship between two neighboring rail assemblies (e.g., rail assembly $130_1$ and rail assembly $130_3$) is described below.

Herein, the first rail assembly $130_1$ features a plurality of flanges $620_1$-$620_3$ extending upward over an upper surface 626 of a ledge member 625 and partially extending over the uppermost raised edge of the first rail assembly $130_1$ (e.g., raised edge $270_5$ of the support member $260_5$). The flanges $620_1$-$620_3$ are offset from each other in a staggered pattern. The offset and staggered pattern of the flanges $620_1$-$620_3$ creates a uniform, continuous spacing 630 between these flanges $620_1$-$620_3$. The spacing 630 has a width sized to receive a lengthwise protruding member 635 of a second rail assembly $130_3$, extending from a bottom surface 636 of a lowermost shelf member 637, when the second rail assembly $130_3$ is vertically aligned with and, after installation, rests on the first rail assembly $130_1$. According to this embodiment, when second rail assembly $130_3$ is resting on the first rail assembly $130_1$, at least one flange (e.g., flanges $620_1$ and $620_2$) resides on one side of the protruding member 635 and at least one flange (e.g., flange $620_3$) resides on the other side of the protruding member 635.

As shown in FIG. 6C, the protruding member 635 extends from the bottom surface 636 of the bottom shelf member 637 (of the second rail assembly $130_3$) is lowered to reside in the spacing 630 created by the flanges $620_1$-$620_3$ extending above the upper surface 626 of the first rail assembly $130_1$. In particular, according to one embodiment of the disclosure, the flanges $620_1$-$620_3$ extend above the upper surface 626 of the ledge member 625 of the raised edge $270_5$ associated with the top support member $260_5$ formed in the first rail assembly $130_1$. For this embodiment, the flanges $620_1$ and $620_2$ are laterally offset in a first direction from an upward portion 627 of the ledge member 625 while the flange $620_3$ is offset in a second (and opposite) direction from the upward portion 627. As shown, the flange $620_3$ may be attached to a sidewall 628 of the upward portion 627 so that the spacing 630 is a portion of the upper surface 626 of the ledge member 625 bounded by the flanges $620_1$-$620_3$. Hence, lateral movement by the protruding member 635 in the second rail assembly $130_3$ is restricted based on the positioning of at least one flange in the first rail assembly $130_1$ on opposite sides of the spacing 630 (e.g., flange $620_1$ and/or $620_2$; flange $620_3$).

Referring back to FIG. 6B, according to one embodiment of the disclosure, the first rail assembly $130_1$ is coupled to the first vertical post pairing 180 by post attachment members 132 and 135 of the first rail assembly $130_1$. The first post attachment member 132 includes one or more connection arms (e.g., arms $133_1$-$133_2$) generally extending in a longitudinal direction and having fastening portions $134_1$-$134_2$, which extending in a lateral direction toward the outer surface $114_1$ of the first post $110_1$, when the first rail assembly $130_1$ is installed as part of the tray storage system. The first post attachment member 132 further includes one or more connection arms (e.g., arm $133_3$) generally extending in the longitudinal direction and having fastening portion $134_3$ extending in a lateral direction toward the outer surface $119_1$ when installed (see FIG. 1).

Hence, the fastening portions $134_1$-$134_3$ are configured to slideably engage with the channels $115_1$/$117_1$ formed into the post $110_1$. By at least one fastening portion (e.g., fastening portions $134_1$-$134_2$) substantially residing within the channel $115_1$ and at least one fastening portion (e.g., fastening portion $134_3$) substantially residing within the channel $117_1$, when the first rail assembly $130_1$ is attached to the first post $110_1$, the first rail assembly $130_1$ is restricted in movement in both the longitudinal and lateral directions. The fastening portions $137_1$-$137_3$ extending from connection arms $136_1$-$136_3$ of the post attachment member 135 are configured to slideably engage with the channels $115_2$/$117_2$ formed into the post $110_2$ in a similar manner as fastening portions $134_1$-$134_3$.

Besides the post attachment members 132 and 135 are illustrated in FIG. 6B, it is contemplated that alternative embodiments of the post attachment members 132 and 135 are available. For instance, as an alternative embodiment and discussing only the first post attachment member 132 for simplicity, the fastening portions $134_1$-$134_3$ of the post attachment members 132 may be angled to interlock with the channel $115_1$. Stated differently, when the post attachment member 132 is coupled to the first post $110_1$, a part of the fastening portions $134_1$-$134_2$ would reside within a spacing between a lip partially extending into the channel area defined by a rear surface of the channel $115_1$. In a similar construction, a part of the fastening portion $134_3$ would reside within a spacing between a lip partially extending into the channel area defined by a rear surface of the channel $117_1$.

As another alternative embodiment, the fastening portions $134_1$-$134_3$ of the post attachment member 132 may be may be configured for a "snap in" engagement in lieu of a channel engagement as described above. In particular, the first post $110_1$ includes multiple recesses at prescribed locations along the first outer surface $114_1$ and the second outer surface $119_1$ and is sized to receive the fastening portions $134_1$-$134_3$. The plurality of connection arms (e.g., at least arms $133_1$ and $133_3$) would be constructed with a certain amount of flexibility to allow the connection arms $133_1$ and $133_3$ to be slightly displaced for attachment to the first post and a certain amount of resiliency to return to their original degree of separation upon insertion into the recesses.

Referring now to FIG. 6D, a top plan view of a rail assembly (e.g., the first rail assembly $130_1$) is shown. The rail assembly $130_1$ includes staggered flanges $625_1$-$625_3$ that create the spacing 630 for receipt of the protruding member from a neighboring rail assembly rail. Furthermore, as shown, the uppermost support member $260_5$ features the raised edge $270_5$ and the shelf member $275_5$. As shown, the shelf member $275_5$ features the plurality of ribs (e.g., ribs $600_1$-$600_{12}$) and a plurality of cutout portions (e.g., cutouts $640_1$-$640_5$). Herein, ribs $600_2$-$600_{11}$ provide functional structural support for a tray when inserted into and resting on the shelf member $275_5$ and ribs $600_1$ and $600_{12}$ prevent the tray from being accidentally dislodged, especially while the tray storage system is in transit. As described above, as optional feature, any combination or all of the ribs $600_1$-$600_{12}$ may be formed by or coated with a material having heat reflective properties better than the composition of material forming the shelf member $275_5$. The cutouts $640_1$-$640_5$ may be formed in any selected pattern to allow a vertical flow of air onto a tray resting on the shelf member $275_5$ while at least ribs $600_2$-$600_{11}$ provide lateral air flow under the tray when resting on the shelf member $275_5$.

Additionally, as described above, the rail assembly $130_1$ features a plurality of post attachment members 132 and 135 located at distal longitudinal ends of the rail assembly $130_1$. As shown, the first post attachment member 132 includes at least the first connection arm (e.g., arm $133_1$) initially extending from a backside of the rail assembly $130_1$ and curved to engage with first channel of a post (e.g., channel $115_1$ of the post $110_1$ as shown in FIG. 1) and at least the third connection arm (e.g., arm $133_3$) extending laterally from the backside of the rail assembly $130_1$ to engage with a second channel of the post (e.g., channel $117_1$ of the post $110_1$ as shown in FIG. 1).

As a result, the first connection arm (e.g., arm $133_1$) and the third connection arm (e.g., arm $133_3$) include fastening portions $134_1$ and $134_3$ that are separated by a prescribed distance from each other and are concurrently retained within the channels $115_1$ and $117_1$ (of the post $110_1$), as described above. This restricts movement of the rail assembly (e.g., rail assembly $130_1$) from the tray storage system 100 vertically along the channels $115_1$ and $117_1$. The same attachment scheme applies to the first and third connection arms $136_1$ and $136_3$ (and corresponding fastening portions $137_1$ and $137_3$) associated with the second post attachment member 135.

Referring now to FIG. 6E, a top plan view of an intermediary shelf member (e.g., shelf member $275_3$) of the rail assembly $130_1$ of FIG. 6A is shown. Herein, multiple reinforcement members 605/610 are illustrated, where the open areas between the reinforcement members 605/610 operate as side vents 650 to allow lateral airflow through the tray storage system. Also, the second connection arm (e.g., arm $133_2$) including the fastening portion $134_2$ is shown with a similar construction as the first connection arm $133_1$ whereby the fastening portion $134_2$ resides within the channel $115_1$ concurrently with the fastening portions $134_1$ and $134_3$.

Referring now to FIG. 6F, an elevated view of a second embodiment of a rail assembly (e.g., rail assembly $130_1$) mating with a neighboring rail assembly (e.g., rail assembly $130_3$) is shown. In accordance with this embodiment, in lieu of the "tongue and groove" engagement as illustrated in FIGS. 6B-6C, neighboring rail assemblies (e.g., rail assembly $130_1$ and rail assembly $130_3$) could be implemented with an insert/boss interlocking scheme. Herein, each rail assembly (e.g., rail assembly $130_1$ as shown) features a plurality of bosses $670_1$-$670_s$ (S≥1) placed within the ledge member 625 extending above (and partially extending over) the uppermost raised edge of the first rail assembly $130_1$ (e.g., raised edge $270_5$ of the support member $260_5$) as shown in FIG. 6G (four support member deployment) and FIG. 6H (five support member deployment). The bosses $670_1$-$670_s$ may be interspersed across the ledge member 625 (e.g., at equidistant locations along the ledge member 625 that extends longitudinally over a top of the rail assembly $130_1$).

Further, each rail assembly (e.g., rail assembly $130_3$ as shown) includes a plurality of inserts $680_1$-$680_s$ aligned with and sized for insertion into bosses of a neighboring rail assembly (e.g., bosses $670_1$-$670_s$ of the first rail assembly $130_1$). Hence, the first rail assembly $130_1$ interlocks with the second rail assembly $130_3$ when the inserts $680_1$-$680_s$ of the second rail assembly $130_3$ are inserted into the bosses $670_1$-$670_s$ of the first rail assembly $130_1$ when the second rail assembly $130_3$ rests on the first rail assembly $130_1$. Of course, it is contemplated that, as another embodiment, the bosses $670_1$-$670_s$ may be positioned at the bottom of the rail assembly $130_3$ while the inserts $680_1$-$680_s$ may be positioned at the top of the rail assembly $130_1$.

Referring now to FIG. 7A, a top plan perspective of an exemplary embodiment of the bottom frame assembly 140 deployed as part of the tray storage system 100 is shown. The bottom frame assembly 140 features a construction similar to the top frame assembly 120 described above. However, the bottom frame assembly 140 does not deploy caps. Rather, bottom post connectors $142_1$-$142_4$ are positioned at the intersection between each longitudinal segment 700 or 705 and each lateral segment 710 or 715, which are located at corners of the bottom frame assembly 140, and provide access to apertures $720_1$-$720_4$ positioned at the bottom post connectors $142_1$-$142_4$.

As shown in FIG. 7B, a cross-sectional view of the bottom frame assembly 140 of FIG. 7A along line 7B-7B oriented in a longitudinal direction is shown. Herein, a plurality of corbels 730 are positioned along interior edges of the lateral segments 710 and 715 of the bottom frame assembly 140, resting on an inner ridge (not shown) along a perimeter of the interior edges. These corbels 730 are spaced apart and extend into the interior area 740 to support a tray or a similarly sized object. Additionally, while the lateral segments 710 and 715 provide the plurality of corbels 730, each of the longitudinal segments 700 and 705 also include a flange 745 formed along outer edge of these segments 700 and 705 to provide lateral reinforcement.

Referring now to FIG. 7C, a cross sectional view of a first longitudinal segment 700 of the bottom frame assembly 140 is shown. Herein, the first longitudinal segment 700 (also labeled as segment 210 of FIG. 2A) comprises a straight connector piece 750 with the bottom post connectors $142_1$-$142_2$ disposed at both ends. As shown, the straight connector piece 750 is hollow, including support walls (not shown) for fortification and the bottom post connectors $142_1$-$142_2$ include apertures $720_1$-$720_2$. A ridge 760 (also labeled as ridge 215 of FIG. 2A) is placed on a top surface 765 (also labeled surface 200 of FIG. 2A) to receive the protruding member from the rail assembly $130_1$.

Responsive to insertion of the wedge connectors $150_5$-$150_6$ into the apertures $720_1$-$720_2$, as collectively shown in FIG. 1 and FIGS. 7A-7C, the plurality of posts $110_1$-$110_4$ are securely coupled to the bottom frame assembly 140. Additionally, the corresponding inserts $160_1$-$160_4$, shaped for insertion through the apertures $720_1$-$720_4$ to snugly and securely fit into the cavities of the posts $110_1$-$110_4$ at the second ends $113_1$-$113_4$. The inserts $160_1$-$160_4$ are adapted to receive the plurality of casters $170_1$-$170_4$, where the plurality of casters $170_1$-$170_4$ are now positioned at the corners of the bottom frame assembly 140 to the tray storage system 100.

Figure 8A:
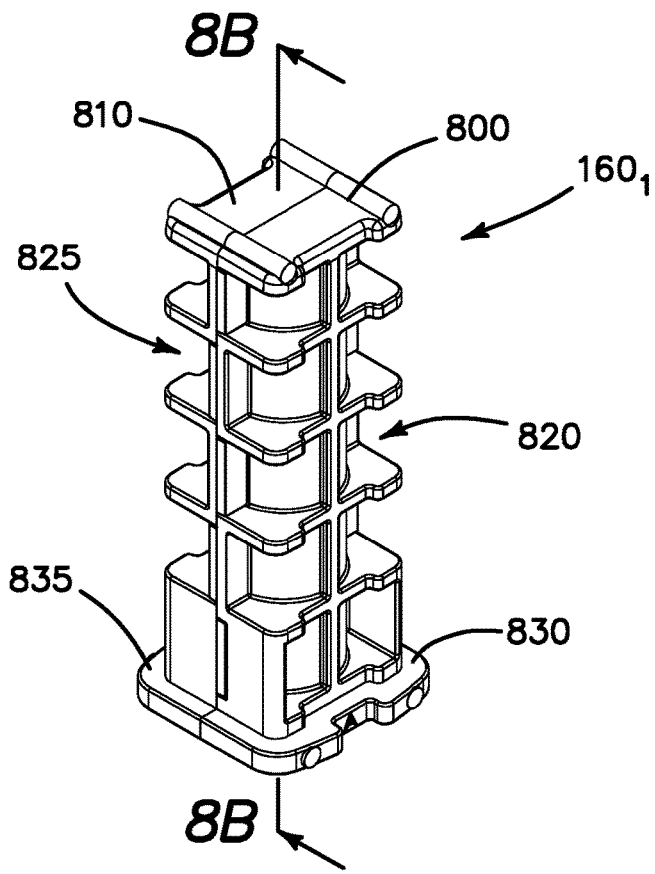
FIG. 8A is an elevated, perspective view of an exemplary embodiment of an insert for insertion into a recess accessible from a bottom side of the bottom frame assembly of FIG. 7A.
Figure 8B:
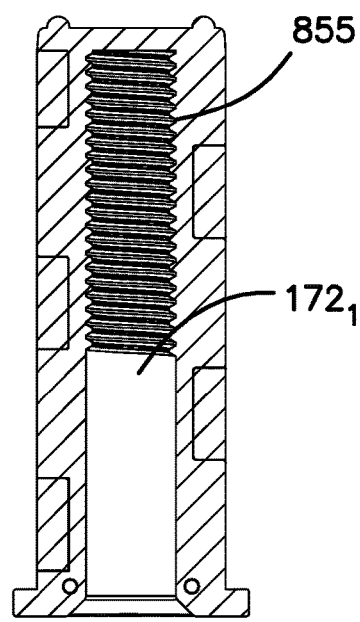
FIG. 8B is a cross-sectional view of the insert of FIG. 8A receiving a threaded vertical shaft of a caster.
Figure 8C:
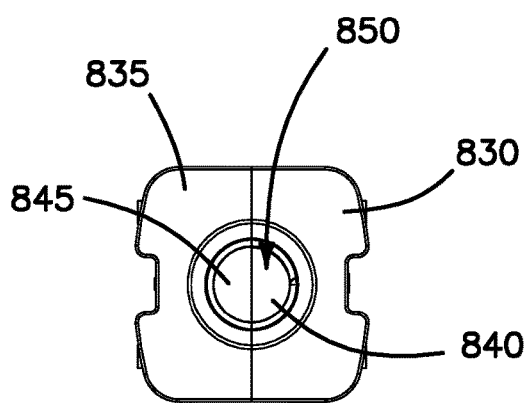
FIG. 8C is an upward perspective view of the insert of FIG. 8A.
Figure 8D:
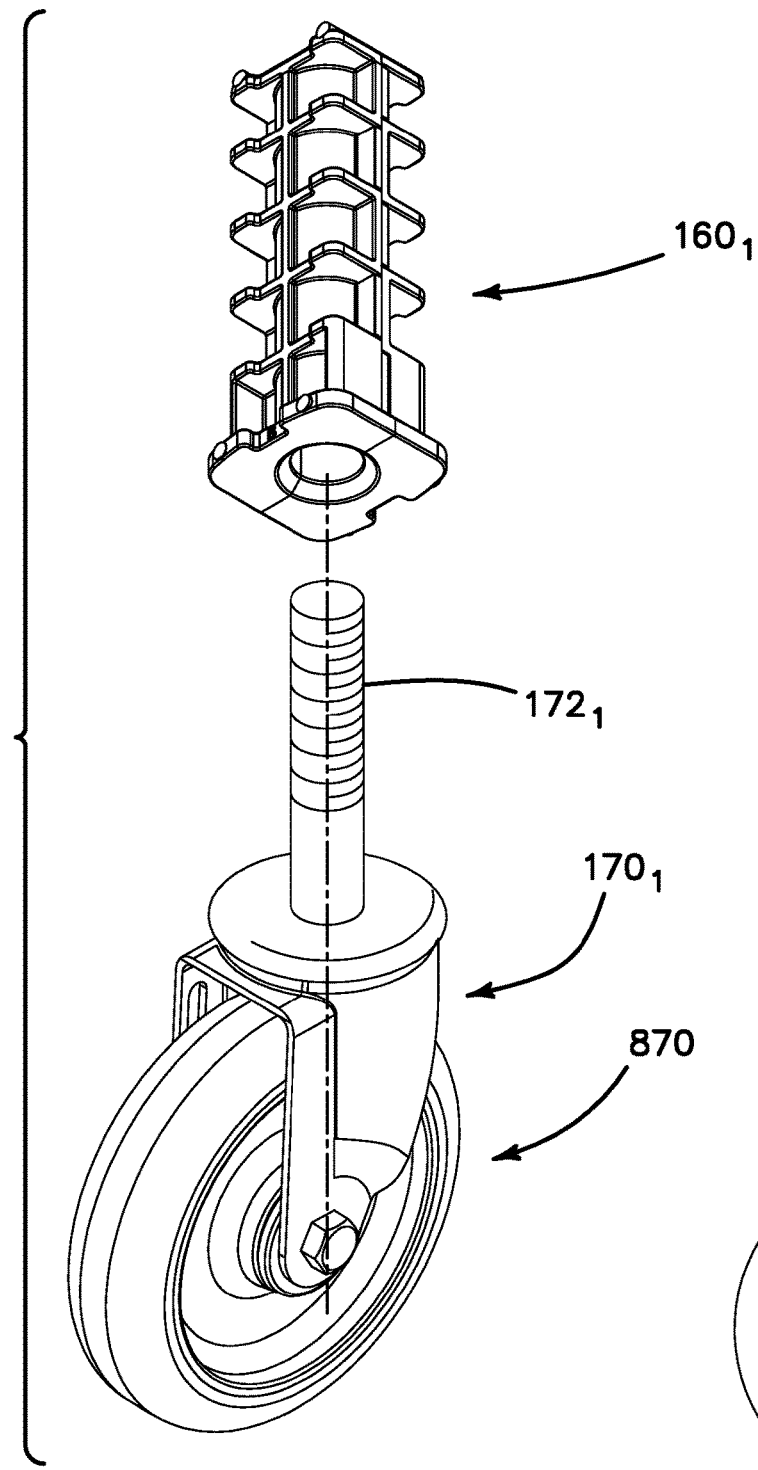
FIG. 8D is an exploded view of the insert of FIGS. 8A-8B adapted to receive the threaded vertical shaft of the caster.

Referring now to FIG. 8A, an elevated perspective view of one of the inserts $160_1$-$160_4$ (e.g., insert $160_1$) is shown. The insert $160_1$ is a bifurcated insert comprised of two halves, namely a first insert half 800 and a second insert half 810. Each insert half 800 and 810 comprises a body portion 820/825 and a base portion 830/835 disposed at one end. Defined within each base portion 830 and 835 is a semi-circular shaped aperture 840 and 845 as shown in FIG. 8C. Collectively, these semi-circular shaped apertures 840/845 start at the base portion 830/835 extending through the longitudinal length of each half 800/810 to form a semi-cylindrical inner bore 850. At the distal end of the bore 850 is a threaded portion 855 configured to receive a threated vertical shaft $172_1$ of the caster $170_1$ as shown in FIGS. 8C-8D.

Figure 8E:
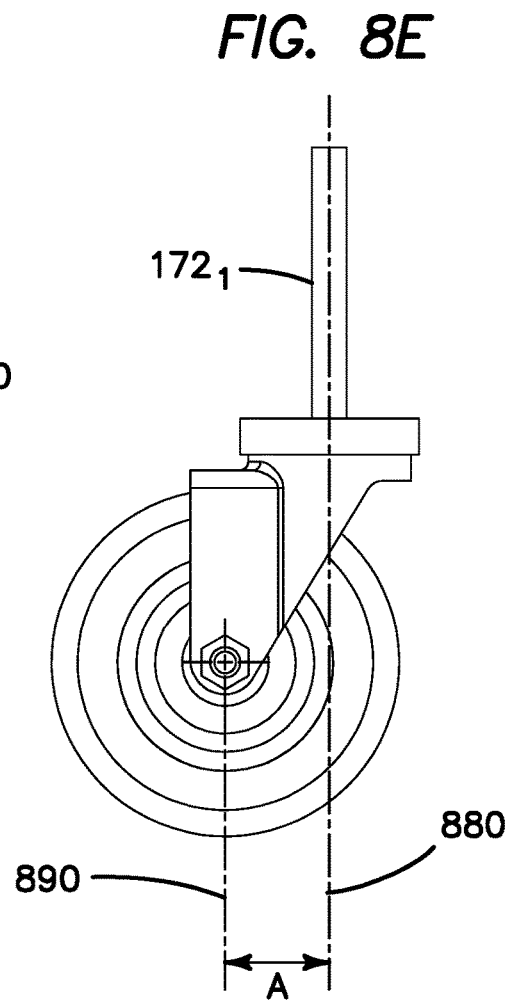
FIG. 8E is a side view of the vertical shaft and caster orientation.

More specifically, as shown in FIG. 8E, the vertical shaft $172_1$ of the caster $170_1$ is threaded into the insert $160_1$ in order to provide a secure coupling between the insert $160_1$ and the caster $170_1$. The caster $170_1$ is sized such that the dimensions between an axis 880 of the vertical shaft 172 and a vertical axis 890 through the central axis of the caster $170_1$ is substantially reduced by approximately forty percent (40%) from a conventional deployment (e.g., reduction from approximately 1.5 inches to approximately less than one inch such as 0.9 inches). The reduced distance "A" provides improved stability of the tray storage system 100 during movement.

In the foregoing description, the invention is described with reference to specific exemplary embodiments thereof. However, it will be evident that various modifications and changes may be made thereto without departing from the broader spirit and scope of the invention as set forth in the appended claims.

What is claimed is:
1. A tray storage system comprising:
a plurality of posts including a first pair of posts and a second pair of posts;
a first frame assembly coupled to each first end of the plurality of posts;
a first rail assembly removably coupled to the first pair of posts, the first rail assembly including a first plurality of shelf members extending from at least one reinforcement member providing structural support for the first plurality of shelf members; and
a second rail assembly removably coupled to the second pair of posts, the second rail assembly including a second plurality of shelf members extending from one or more reinforcement members providing structural support for the second plurality of shelf members,
wherein each corresponding shelf member of the first plurality of shelf members includes a plurality of ribs formed on a top planar surface of the corresponding shelf member between end portions of the corresponding shelf member and each corresponding shelf member of the first plurality of shelf members includes a plurality of cut-out portions formed along an edge extending in a direction away from the at least one reinforcement member to provide vertical air flow to any item supported by the corresponding shelf member and each cut-out portion of the plurality of cut-out portions being located between a rib pairing of the plurality of ribs.

2. The tray storage system of claim 1, wherein each of the plurality of posts is made of fiberglass and formed by pultrusion and both the first rail assembly and the second rail assembly is made of polypropylene and formed by injection molding.

3. The tray storage system of claim 1, wherein each of a first post and a second post of the first pair of posts includes (i) a first channel traversing lengthwise along a first outer surface of the first post, (ii) a first notch traversing the first channel, (iii) a second channel traversing lengthwise along a second outer surface being opposite to the first outer surface of the first post, and (iv) a second notch traversing the second channel,
the first rail assembly includes a plurality of post attachment members interlocking with the first channel and the second channel, and
the first notch and the second notch retain a connector positioned at the first end of the first post to attach to the first frame assembly.

4. The tray storage system of claim 1, wherein at least the plurality of ribs associated with the first rail assembly being formed of a first material with a greater heat reflective properties than a second material forming the plurality of shelf members of the first rail assembly.

5. The tray storage system of claim 1 further comprising:
a third rail assembly removably coupled to the first pair of posts, the third assembly comprises a plurality of longitudinal protruding members that are oriented to interlock with a plurality of staggered, offset flanges formed on a ledge member and positioned above an uppermost shelf member of the first plurality of shelf members formed in the first rail assembly.

6. The tray storage system of claim 1 further comprising a second frame assembly coupled to each second end of the plurality of posts, the second frame assembly being adapted to receive a plurality of casters.

7. The tray storage system of claim 6, wherein the first pair of posts includes (i) a first post including a first channel traversing lengthwise along a first outer surface of the first post and a second channel traversing lengthwise along a second outer surface being opposite to the first outer surface of the first post and (ii) a second post including a first channel traversing lengthwise along a first outer surface of the second post and a second channel traversing lengthwise along a second outer surface being opposite to the first outer surface of the second post.

8. The tray storage system of claim 7, wherein the first rail assembly comprises a first post attachment member including a first fastening portion sized for insertion and retention in the first channel of the first post, a second post attachment member including a second fastening portion sized for insertion and retention in the second channel of the first post, a third post attachment member including a third fastening portion sized for insertion and retention in a first channel of the second post, and a fourth post attachment member including a fourth fastening portion sized for insertion and retention in the second channel of the second post.

9. A tray storage system comprising:
a plurality of posts including a first pair of posts and a second pair of posts;
a first rail assembly removably coupled to the first pair of posts;
a second rail assembly removably coupled to the second pair of posts; and
a third rail assembly removably coupled to the first pair of posts,
wherein each of the first rail assembly and the second rail assembly includes a plurality of shelf members and each corresponding shelf member of the plurality of shelf members includes (i) a plurality of ribs formed on a top planar surface of the plurality of shelf members between ends of the corresponding shelf member and (ii) a plurality of cut-out portions formed in the corresponding shelf member between a pair of neighboring ribs of the plurality of ribs to provide vertical air flow to any item supported by the corresponding shelf member, and
wherein the third rail assembly comprises a longitudinal protruding member to interlock with a plurality of staggered, offset flanges positioned on a ledge member positioned above an uppermost shelf member of the plurality of shelf members formed in the first rail assembly.

10. The tray storage system of claim 9, wherein at least the plurality of ribs associated with the first rail assembly being formed of a first material with a greater heat reflective properties than a second material forming the plurality of shelf members of the first rail assembly.

11. The tray storage system of claim 9, wherein the longitudinal protruding member being inserted between the plurality of staggered, offset flanges for interlocking the third rail assembly with the first rail assembly.

12. The tray storage system of claim 9 further comprising a first frame assembly being adapted to receive a first end of the plurality of posts and a second frame assembly being adapted to receive a plurality of casters.

13. The tray storage system of claim 9, wherein the first pair of posts includes (i) a first post including a first channel traversing lengthwise along a first outer surface of the first post and a second channel traversing lengthwise along a second outer surface being opposite to the first outer surface of the first post and (ii) a second post including a first channel traversing lengthwise along a first outer surface of the second post and a second channel traversing lengthwise along a second outer surface being opposite to the first outer surface of the second post.

14. The tray storage system of claim 13, wherein the first rail assembly comprises a first post attachment member including a first fastening portion sized for insertion and retention in the first channel and a second post attachment including a second fastening portion sized for insertion and retention in the second channel of the first post.

* * * * *